US012596766B2

(12) United States Patent
Harikumar et al.

(10) Patent No.: US 12,596,766 B2
(45) Date of Patent: Apr. 7, 2026

(54) AUTOMATICALLY GENERATING AN IMAGE DATASET BASED ON OBJECT INSTANCE SIMILARITY

(71) Applicant: Adobe Inc., San Jose, CA (US)

(72) Inventors: Midhun Harikumar, Santa Clara, CA (US); Zhe Lin, Fremont, CA (US); Shabnam Ghadar, Menlo Park, CA (US); Baldo Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 1057 days.

(21) Appl. No.: 17/337,194

(22) Filed: Jun. 2, 2021

(65) Prior Publication Data

US 2022/0391633 A1 Dec. 8, 2022

(51) Int. Cl.
*G06N 3/08* (2023.01)
*G06F 18/211* (2023.01)
(Continued)

(52) U.S. Cl.
CPC .......... *G06F 18/211* (2023.01); *G06F 18/214* (2023.01); *G06F 18/22* (2023.01);
(Continued)

(58) Field of Classification Search
CPC .......... G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS 6,092,072 A * 7/2000 Guha ....................... G06N 5/01
707/700
8,452,088 B1 * 5/2013 De Ponti ................. G06F 16/55
382/165
(Continued)

FOREIGN PATENT DOCUMENTS

CN 110162657 A * 8/2019 ......... G06F 16/5838
CN 110516689 A * 11/2019
(Continued)

OTHER PUBLICATIONS

Li et al., "Recent Development of Content-Based Image Retrieval", Jan. 4, 2021, ELSEVIER, pp. 675-689 (Year: 2021).*
(Continued)

*Primary Examiner* — Paulinho E Smith
(74) *Attorney, Agent, or Firm* — Keller Preece PLLC

(57) ABSTRACT

Methods, systems, and non-transitory computer readable media are disclosed for accurately and efficiently generating groups of images portraying semantically similar objects for utilization in building machine learning models. In particular, the disclosed system utilizes metadata and spatial statistics to extract semantically similar objects from a repository of digital images. In some embodiments, the disclosed system generates color embeddings and content embeddings for the identified objects. The disclosed system can further group similar objects together within a query space by utilizing a clustering algorithm to create object clusters and then refining and combining the object clusters within the query space. In some embodiments, the disclosed system utilizes one or more of the object clusters to build a machine learning model.

20 Claims, 12 Drawing Sheets

(51) Int. Cl.

| | |
|---|---|
| *G06F 18/214* | (2023.01) |
| *G06F 18/22* | (2023.01) |
| *G06F 18/2321* | (2023.01) |
| *G06F 18/25* | (2023.01) |

(52) U.S. Cl.
CPC .......... *G06F 18/2321* (2023.01); *G06F 18/25* (2023.01); *G06N 3/08* (2013.01)

(56) References Cited

U.S. PATENT DOCUMENTS

| | | | | |
|---|---|---|---|---|
| 10,296,811 | B2 * | 5/2019 | Krupka | G06F 18/23 |
| 11,042,776 | B1 * | 6/2021 | Buhler | H04N 1/00018 |
| 11,335,069 | B1 * | 5/2022 | Savchenkov | G06N 20/00 |
| 2011/0122224 | A1 * | 5/2011 | Lou | H04N 19/115 |
| | | | | 348/E13.001 |
| 2011/0211736 | A1 * | 9/2011 | Krupka | G06F 16/5854 |
| | | | | 382/118 |
| 2011/0225153 | A1 * | 9/2011 | Haseyama | G11B 27/34 |
| | | | | 707/E17.061 |
| 2011/0229024 | A1 * | 9/2011 | El-Maraghi | G06T 7/12 |
| | | | | 382/162 |
| 2016/0125270 | A1 * | 5/2016 | Gokturk | G06F 18/22 |
| | | | | 382/118 |
| 2019/0130229 | A1 * | 5/2019 | Lu | G06T 7/194 |
| 2019/0332958 | A1 * | 10/2019 | Subhankar | G01N 29/4454 |
| 2020/0372079 | A1 * | 11/2020 | De Vries | G06F 16/906 |
| 2020/0389635 | A1 * | 12/2020 | Afifi | G06V 10/56 |
| 2021/0027470 | A1 * | 1/2021 | Lin | G06T 11/60 |
| 2021/0158043 | A1 * | 5/2021 | Hou | G06V 10/454 |
| 2022/0375090 | A1 * | 11/2022 | Hwang | G06T 7/11 |

FOREIGN PATENT DOCUMENTS

| | | | | | |
|---|---|---|---|---|---|
| EP | 1816575 | A1 * | 8/2007 | ............ | G06F 16/40 |
| EP | 3358479 | A1 * | 8/2018 | | |

OTHER PUBLICATIONS

Li et al., "A Multi-Level Contextual Model for Person Recognition in Photo Albums", 2016, IEEE, 1297-1305. (Year: 2016).*

Cazzolato, "Conquering Knowledge from Images: Improving Image Mining with Region-Based Analysis and Associated Information", Sep. 2019, pp. 1-138 (Year: 2019).*

John et al., "Part Based Recognition of Pedestrians Using Multiple Features and Random Forests", 2010, Digital Image Computing: Techniques and Applications, IEEE, pp. 363-368 (Year: 2010).*

Stamou et al., "Multimedia Content and the Semantic Web: Methods, Standards and Tools", Apr. 20, 2005, John Wiley & Songs, Ltd., pp. 1-392 (Year: 2005).*

Xu et al., "Automatic Moving Object Extraction for Content-Based Applications", Jun. 2004, IEEE Transactions on Circuits and Systems for Video Technology, vol. 14 No. 6, pp. 796-812 (Year: 2004).*

Ren et al., "Deep Density-based Image Clustering", Dec. 11, 2018, arXiv.com, pp. 1-10 (Year: 2018).*

* cited by examiner

200

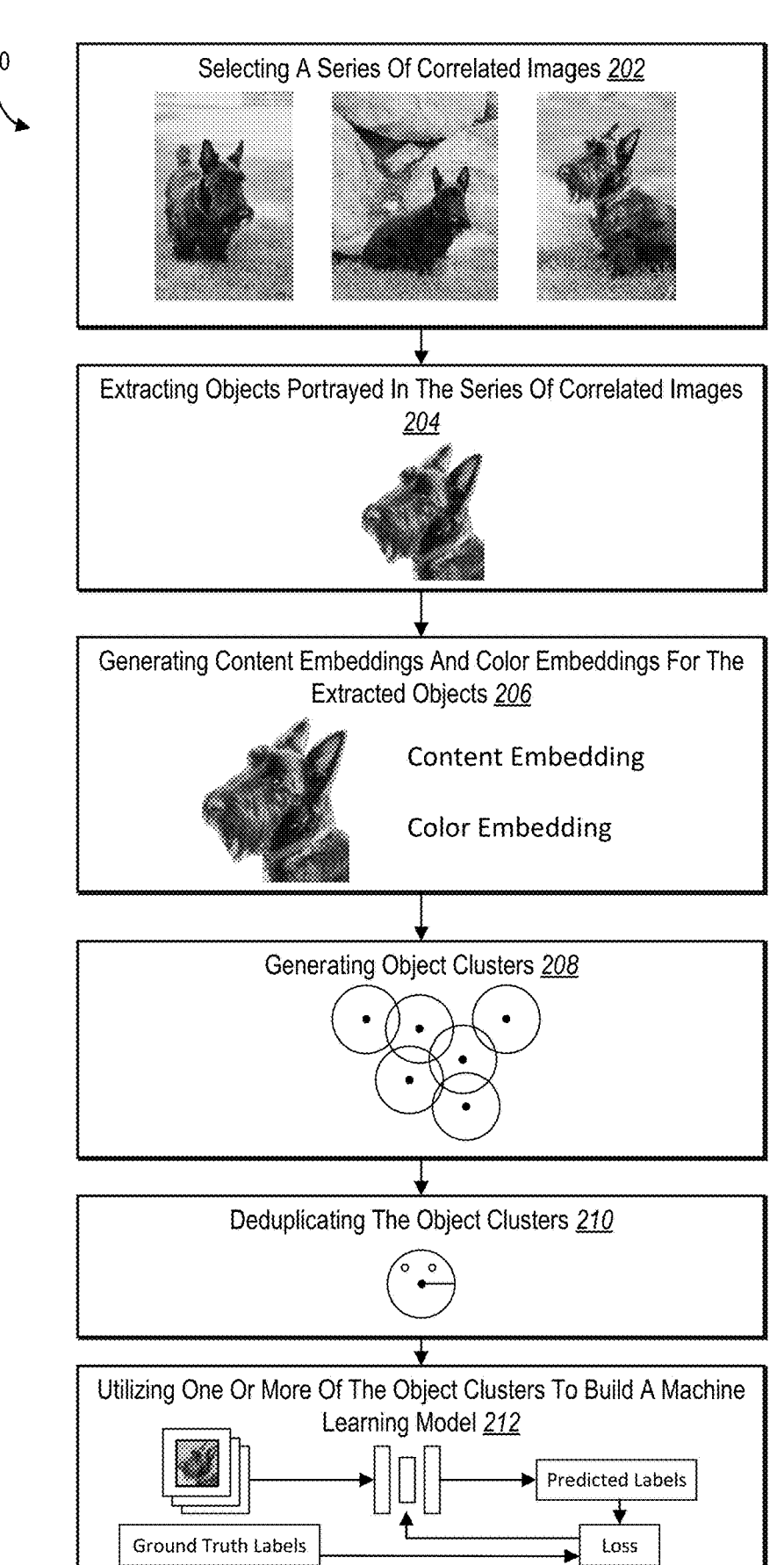

Selecting A Series Of Correlated Images 202

Extracting Objects Portrayed In The Series Of Correlated Images 204

Generating Content Embeddings And Color Embeddings For The Extracted Objects 206

Content Embedding

Color Embedding

Generating Object Clusters 208

Deduplicating The Object Clusters 210

Utilizing One Or More Of The Object Clusters To Build A Machine Learning Model 212

Predicted Labels

Ground Truth Labels

Loss

Detecting Objects In The Series Of Correlated Images *402*

*408*

Object Detection Model *410*

412a

412b

Generating Segmentation Masks Of The Objects *404*

412a

412b

Segmentation Model *414*

416a

416b

Removing Image Data Not Associated With The Segmentation Masks From The Series Of Correlated Images *406*

418a

418b

500

Generating Content Embeddings *502*

510

Convolutional
Neural Network
*512*

$\begin{bmatrix} x_1 \\ x_2 \\ \vdots \\ x_n \end{bmatrix}$  514

Generating Color Embeddings *504*

510

516

Pixel Count

Color Value

Generating Combined
Embeddings *506*

Mapping The Combined Embeddings In A Query
Space *508*

518a

518b

518c

518d

600

Computing Device 900

Digital Image Management System 104

Instance Extraction System 106

Digital Image Selector 902

Series Selector 904

Object Extraction Manager 906

Content Embedding Manager 908

Color Embedding Manager 910

Object Cluster Generator 912

Machine Learning Model Manager 914

Storage Manager 916

Digital Images 918

1000

AUTOMATICALLY GENERATING AN IMAGE DATASET BASED ON OBJECT INSTANCE SIMILARITY

BACKGROUND

Recent years have seen a significant improvement in hardware and software platforms for creating training image datasets for building machine learning models. Indeed, conventional systems can utilize crowd-sourcing devices and corresponding users to classify, tag, and label digital images that portray objects to utilize in training various types of machine learning models. To illustrate, conventional systems can utilize training image datasets to build machine learning models used to process images based on objects within the images. Despite these advances, conventional systems continue to suffer from a number of significant shortcomings, particularly with regard to accuracy, efficiency, and functionality of implementing computing devices.

BRIEF SUMMARY

One or more embodiments provide benefits and/or solve one or more problems in the art with systems, methods, and non-transitory computer readable storage media that accurately and efficiently generate comprehensive instance similarity image datasets including multiple unique classes with visually and semantically similar objects. For example, the disclosed system can utilize an intelligently sampled series of digital images together with content and color embeddings to generate unsupervised digital image clusters that portray unique classes of objects that can be utilized to efficiently build accurate machine learning models.

To illustrate, the disclosed system extract objects of the same type from a repository of digital images utilizing stratified sampling and metadata analysis. In one or more embodiments, the disclosed system generates a content embedding and a color embedding for objects within each digital image within the series of images. Furthermore, the disclosed system utilizes a clustering algorithm to process the content and color embeddings, group similar objects together, and extract objects from the series while disregarding outlier objects. Thus, the disclosed system can utilize the object clusters to group digital images portraying visually and semantically similar objects. The disclosed system can further use the groups of images to build various types of machine learning models. In this manner, the disclosed systems can efficiently and accurately generate comprehensive image datasets comprising a variety of different object classes for building more robust machine learning models.

Additional features and advantages of one or more embodiments of the present disclosure will be set forth in the description which follows or may be learned by the practice of such example embodiments.

BRIEF DESCRIPTION OF THE DRAWINGS

Various embodiments will be described and explained with additional specificity and detail through the use of the accompanying drawings which are summarized below.

FIG. 2 illustrates an overview diagram of generating and utilizing one or more object clusters to build a machine learning model in accordance with one or more embodiments of the present disclosure.

DETAILED DESCRIPTION

Figure 1:
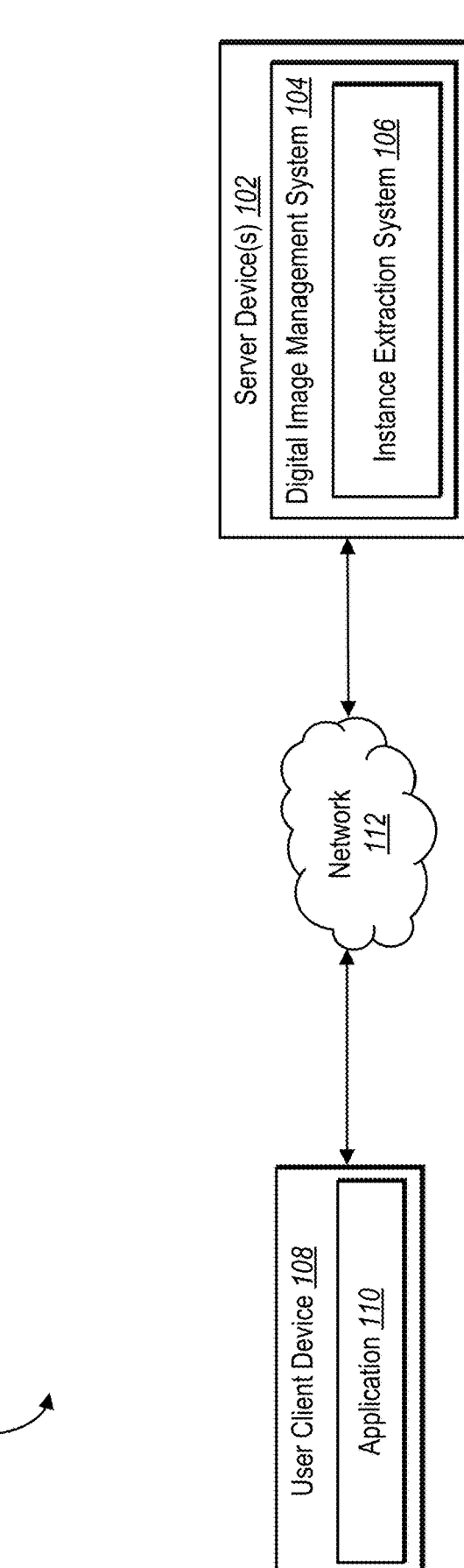
FIG. 1 illustrates an environment in which an instance extraction system can operate in accordance with one or more embodiments of the present disclosure.

One or more embodiments of the present disclosure includes an instance extraction system that accurately and efficiently generates image datasets portraying semantically and visually similar instances of objects for building more robust and accurate machine learning models. In particular, the instance extraction system selects a series of images having similar objects from an image database using stratified concept sampling and an analysis of metadata tags associated with the images. In one or more embodiments, the instance extraction system further processes the series of images by extracting objects from each image and generating content embeddings and color embeddings for each extracted object. The instance extraction system can further use the content embeddings and the color embeddings to cluster the objects detected within the series utilizing a clustering algorithm. In some embodiments, the instance extraction system deduplicates and refines the clusters to create independent classes portraying the same object. Moreover, the instance extraction system can use one or more of the object clusters to build a machine learning model, such as a similarity machine learning model that accurately identifies similar digital images relative to an image query.

As just mentioned, in some embodiments, the instance extraction system selects a series of correlated images from digital images. Generally, the instance extraction system performs stratified sampling of the digital images to focus subsequent processing on images portraying similar objects. More specifically, the instance extraction system intelligently samples digital images from a repository of digital images to efficiently process a subset of the digital images. For instance, in one or more embodiments, the instance extraction system extracts the series of correlated images that comprise a weakly labeled set of related images. In some embodiments, the instance extraction system selects the series of correlated images by identifying digital images having similar metadata tags. For example, the instance extraction system can identify a subset of digital images having time metadata tags withing a threshold time period, location metadata tags within a threshold distance, matching user identification metadata tags, and other similarities.

Additionally, in some embodiments, the instance extraction system extracts objects portrayed in the series of correlated images. In one example, the instance extraction system generates background/foreground masks for the series of correlated images by utilizing an object detection model and a segmentation model. In particular, the instance extraction system can utilize an object detection model to detect the objects in the series of correlated images. The instance extraction system can further utilize a segmentation model to generate segmentation masks of the detected objects. The instance extraction system can then generate background masks that remove image data not associated with the object by inverting the segmentation masks. Thus, the instance extraction system can extract objects portrayed in the series of images. By masking the image crops, the instance extraction system reduces effects from the background or other objects within the digital images.

As previously mentioned, the instance extraction system can generate content embeddings for the extracted objects. Generally, the instance extraction system generates content embeddings to capture the semantic properties of the detected objects. In some embodiments, the instance extraction system generates the content embeddings by generating feature vectors from the extracted objects by utilizing a neural network (e.g., a convolutional neural network) trained to generate semantic image labels. The instance extraction system can utilize the generated feature vectors as the content embeddings.

Furthermore, the instance extraction system can also generate color embeddings for the extracted objects. The instance extraction system generates the color embeddings to capture cues for lighting and saturation for the extracted objects. In one example, the instance extraction system generates the color embeddings by forming a histogram of pixel values in a lab space. In particular, the instance extraction system can group pixels of the extracted objects into a plurality of colors to generate color histograms and utilize the color histograms as the color embeddings.

In some embodiments, the instance extraction system generates object clusters by grouping semantically similar objects from the content embeddings and the color embeddings. In particular, the instance extraction system can combine the content embeddings and the color embeddings and map the combined embeddings to a query space. The instance extraction system can further utilize a clustering algorithm to generate object clusters from the combined embeddings. In one example, the instance extraction system utilizes a density-based clustering algorithm to identify groups of semantically and visually similar objects. Each object cluster can be separated into individual sets of digital images portraying an instance of an object.

In one or more embodiments, the instance extraction system further deduplicates and refines the object clusters. Duplicate object clusters that are associated with the same instance of an object can negatively affect training such as during negative sampling. Thus, the instance extraction system can merge duplicate object clusters. In one example, the instance extraction system can deduplicate the object clusters by generating a mean cluster embedding for an object cluster of the object clusters and generating a nearest mean cluster embedding for a nearest object cluster. The instance extraction system can merge the nearest object cluster with the object cluster based on a distance between the nearest mean cluster embedding and the mean cluster embedding falling within a threshold distance value.

As mentioned above, the instance extraction system can use one or more of the object clusters to build a machine learning model. For example, in some embodiments, the instance extraction system utilizes one or more object clusters to build a digital image similarity machine learning model. In particular, the instance extraction system can utilize groups of digital images corresponding with the one or more object clusters as a ground truth similarity data set for building a digital image similarity machine learning model. The instance extraction system can further utilize the digital image similarity machine learning model to process a plurality of digital images to generate a plurality of digital image embeddings for use in responding to digital image queries.

As mentioned above, conventional systems have several shortcomings, particularly with regard to the accuracy, efficiency, and functionality of implementing computing devices. For instance, in generating training image datasets, conventional systems are often inaccurate. In particular, many conventional systems rely on human-generated annotations from client devices to create ground truth data. Utilizing such labels often leads to inaccuracies stemming from sampling issues. For example, conventional systems must often rely on crowd sourcing computing devices to generate a significant number of ground truth labels. By crowd sourcing, conventional systems frequently generate training image datasets with inconsistent or inaccurate labels.

Additionally, conventional systems are often inefficient. For example, conventional systems often expend significant computing and communication resources to generate a training image dataset. More specifically, conventional systems typically expend computing and communication resources to send training images, generate a variety of user interfaces, monitor a significant number of user interface interactions, and processing generated labels. Because many training datasets can include thousands or millions of training samples, these conventional systems require exorbitant amounts of time and processing power. Furthermore, many conventional systems cannot efficiently make adjustments to training image datasets. To illustrate, in order to generate more granular labels (e.g., the class, color, or other descriptor of an object), conventional systems must often repeat the labeling process with the new labels.

Conventional systems also suffer from lack of functionality in generating training image datasets. Due in part to the inefficiencies mentioned above, conventional systems often generate training image datasets that are specific to a single user or a limited set of purposes. For instance, training image datasets generated by conventional systems often contain limited numbers of samples. Furthermore, the existing samples are often limited in scope. To illustrate, training image datasets compiled by conventional systems are often limited to a small subset of object classes. For instance, conventional systems often generate training datasets limited to rigid objects such as buildings and landmarks. Thus, conventional systems often suffer from limited functionality.

The instance extraction system can provide numerous advantages, benefits, and practical applications over conventional systems. For example, the instance extraction system can improve accuracy, efficiency, and functionality relative to conventional systems. Indeed, the instance extraction system can accurately generate one or more object clusters that include similar instances of objects. In particular, instead of relying on error-prone human-generated labels from client devices as do many conventional systems, the instance extraction system can generate a variety of accurate instance classes in an unsupervised manner. More specifically, the instance extraction system can generate and intelligently refine object clusters based on content embeddings and color embeddings, clustering algorithms, and refinement processes. By analyzing these embeddings within a query space, the instance extraction system can accurately group object instances into classes that are both semantically and visually similar for building a variety of machine learning models.

Moreover, the instance extraction system improves efficiency relative to conventional systems. In particular, the instance extraction system significantly reduces computing and communication resources required by many conventional systems to distribute digital images, generate user interfaces, monitor user interactions, and collect and manage human-generated labels. Additionally, the instance extraction system utilizes stratified sampling of a repository of digital images to reduce the amount of computing resources required to process images. In some embodiments, the instance extraction system can sample loosely correlated images and also efficiently select digital images within a series of correlated images based on metadata. Furthermore, the instance extraction system can also perform the series of steps in a distributed computing environment to improve the efficiency and speed for generating similar instance image datasets.

In addition to the foregoing, the instance extraction system improves functionality relative to conventional systems by capturing instance level similarity for a varied distribution of objects within an image dataset. In contrast to conventional systems that typically label and group images with a limited scope of objects, the instance extraction system can group digital images with instance level similarity across broad ranges of digital images and object instances. To illustrate, the instance extraction system can generate color and content embeddings for a varied distribution of objects regardless of object type and class. Accordingly, the instance extraction system can generate image datasets of great scale and scope where images are grouped by visually similar objects.

The following disclosure provides additional detail regarding the instance extraction system in relation to illustrative figures portraying example embodiments and implementations of the instance extraction system. For example, FIG. 1 illustrates a schematic diagram of a system environment (or "environment") 100 in which an instance extraction system 106 operates in accordance with one or more embodiments. As illustrated in FIG. 1, the environment 100 includes a user client device 108, a network 112, and server device(s) 102.

While FIG. 1 shows an embodiment of the instance extraction system 106, alternative embodiments and configurations are possible. For instance, in one or more embodiments, the environment 100 includes a different number of client devices, servers, or other components in communication with the instance extraction system 106 via the network 112. In another example, the server device(s) 102 represent a set of connected server devices. As a further example, the user client device 108 communicates directly with the server device(s) 102, bypassing the network 112 or utilizing a separate and/or additional network.

In some embodiments, the server device(s) 102, the network 112 and the user client device 108 are communicatively coupled with each other either directly or indirectly. For example, and as shown in FIG. 1, the server device(s) 102 and the user client device 108 are connected via the network 112. Each of the components of the environment 100 communicate via the network 112. The network 112 comprises any suitable network over which computing devices can communicate. Example networks are discussed in additional detail below in relation to FIG. 11.

As illustrated in FIG. 1, the environment 100 includes the server device(s) 102. The server device(s) 102 generate, store, receive, and transmit digital content including software hosted at the server device(s) 102, digital video, digital images, digital audio, digital designs, metadata, etc. In particular, the server device(s) 102 receive, manage, and modify digital images. For instance, in some embodiments, the server device(s) 102 receives, accesses, and stores repositories of digital images. In some embodiments, the server device(s) 102 comprises a data server. Additionally, or alternatively, the server device(s) 102 comprises a communication server or a web-hosting server.

As further shown in FIG. 1, the server device(s)102 includes digital image management system 104. Generally, digital image management system 104 facilitates the management of digital images. In one example, the digital image management system 104 processes and organizes a repository of digital images. For example, a digital image can include a computer representation of visual content. To illustrate, in some implementations a digital image includes a digital graphics file that, when rendered, displays one or more objects. For instance, a digital image can include a digital photograph captured by a camera that portrays one or more objects. In some circumstances, digital images are associated with metadata tags. Additionally, in some embodiments, a digital image comprises a frame in a digital video.

In some embodiments, the digital image management system 104 accesses and processes digital images for building various types of machine learning models. For example, a machine learning model can include a computational model that can be tuned (e.g., trained) based on inputs to approximate unknown functions and make predictions on data. In particular, a machine learning model can include a model that uses machine learning algorithms to learn to approximate complex functions and generate data-driven predictions or decisions based on a plurality of inputs (e.g., a training dataset including a plurality of digital images portraying similar objects). For example, a machine learning model can include, but is not limited to, a neural network (e.g., a convolutional neural network, LSTM neural network, recurrent neural network, graph neural network, or generative neural network), decision tree, perceptrons, association rule learning, inductive logic programming, support vector learning, Bayesian network, regression-based model, principal component analysis, or a combination thereof.

Moreover, in some embodiments, the digital image management system 104 operates in connection with one or more applications to generate training image datasets for training machine learning models. The digital image management system 104 can also assist in identifying and providing digital images to the user client device 108. For example, the digital image management system can provide digital images in response to a digital image query.

As illustrated in FIG. 1, the digital image management system 104 includes the instance extraction system 106. As described in additional detail below, the instance extraction system 106 automatically extracts similar instances of objects from a repository of digital images. For example, an object can include a thing within a digital image. An object can comprise a thing, material, or person portrayed in a digital image. For example, an object can comprise a dog, cup, person, building, plant, or other thing within a digital image. A digital image can portray one or more objects.

In some embodiments, the instance extraction system 106 selects a series of correlated images from digital images based on metadata associated with the digital images. The instance extraction system 106 further extracts objects portrayed in the correlated images and generates content embeddings and color embeddings for the extracted objects. The instance extraction system 106 can generate object clusters by grouping semantically similar objects based on the content embeddings and color embeddings. In some embodiments, the instance extraction system 106 utilizes some or all of the object clusters to build a machine learning model. In one example, the instance extraction system 106 utilizes object clusters to build a digital image similarity machine learning model to identify similar digital images responsive to a digital image query.

As illustrated in FIG. 1, the environment 100 includes the user client device 108. The user client device 108 generates, stores, receives, and sends digital data. For example, the user client device 108 communicates with the server device(s) 102 via the network 112. The user client device 108 illustrated in FIG. 1 comprises various types of client devices. For example, in some embodiments, the user client device 108 comprises mobile devices such as laptops, tablets, mobile telephones, smartphones, etc. In other embodiments, the user client device 108 includes non-mobile devices, such as desktops or servers, or other types of client devices. Additional details with regard to the user client device 108 are discussed below with respect to FIG. 11.

In some embodiments, the user client device 108 is associated with a user of an image management application provided by the digital image management system 104. Generally, the user client device 108 receives, from the server device(s) 102 and via the network 112, data utilized in digital image management. For example, the user client device 108 receives data including algorithms or other systems by which to manage, organize, and surface digital images. In some embodiments, the user client device 108 provides, to the digital image management system 104, access to a repository of digital images.

As further illustrated in FIG. 1, the user client device 108 includes an application 110. In some embodiments, the application 110 comprises a web application or a native application on the user client device 108 (e.g., a mobile application, a desktop application, etc.). As illustrated, the application 110 interfaces with the instance extraction system 106 to provide digital data including graphical user interfaces, user interactions, digital images, and operations. For example, in one or more embodiments, the instance extraction system 106 comprises a mobile application that renders a graphical user interface that includes features and elements for processing digital images. Additionally, the application 110 also renders a graphical user interface for uploading digital images. The application 110 sends and receives data from the instance extraction system 106 and presents, for display at the user client device 108, digital images, clusters of digital images, and other data for training a machine learning model.

Although FIG. 1 depicts the instance extraction system 106 located on the server device(s) 102, in some embodiments, the instance extraction system 106 is implemented by (e.g., located entirely or in part) on one or more other components of the environment 100. In one example, the instance extraction system 106 is implemented entirely (or in part) on the user client device 108. For instance, the server device(s) 102 and/or the user client device 108 can have the digital images stored thereon.

Additionally, in some embodiments, the user client device 108 communicates directly with the instance extraction system 106, bypassing the network 112. Moreover, the instance extraction system 106 can access one or more databases (e.g., a digital image database) housed on the server device(s) 102 or elsewhere in the environment 100. Further, in some embodiments, the instance extraction system 106 includes one or more machine learning models (e.g., neural networks). In one or more embodiments, the instance extraction system 106 is implemented in a variety of different ways across the server device(s) 102, the network 112, and the user client device 108.

As mentioned above, the instance extraction system 106 can generate instance similarity datasets that can be utilized to build a machine learning model. For example, FIG. 2 illustrates an overview of the instance extraction system 106 generating object clusters and utilizing the one or more object clusters to build a machine learning model in accordance with one or more embodiments. In particular, FIG. 2 illustrates a series of acts 200 comprising an act 202 of selecting a series of correlated images, an act 204 of extracting objects portrayed in the series of images, an act 206 of generating content embeddings and color embeddings for the extracted objects, an act 208 of generating object clusters, an act 210 of deduplicating the object clusters, and an act 212 of utilizing one or more of the object clusters to build a machine learning model.

As illustrated in FIG. 2, the series of acts 200 includes the act 202 of selecting a series of correlated images. In one or more embodiments, the instance extraction system 106 selects the digital images from which to identify series of correlated images by performing stratified sampling. For example, in one or more embodiments, the instance extraction system 106 performs stratified sampling based on shared object keywords. For example, the instance extraction system 106 can select the shared object keywords based on historical image queries, database categories, common object classes, or upload keywords.

As mentioned previously, the instance extraction system 106 identifies the series of correlated images that comprise images that contain similar objects to extract in subsequent steps. By performing the act 202 of selecting the series of correlated images, the instance extraction system 106 improves (e.g., optimizes) the number of images processed in later steps. In one example, the instance extraction system 106 performs the act 202 by determining, based on metadata associated with the digital images, a subset of images having similar metadata tags. For example, metadata can include a set of data associated with a digital image. In particular, metadata can comprise data that conveys information about a digital image, such as the time an image was captured, the location where the image was captured, information indicating the person who captured/uploaded the image, the time an image was uploaded, and other information relating to digital images. More specifically, metadata can comprise specific metadata tags that indicate particular portions of information.

Figure 3:
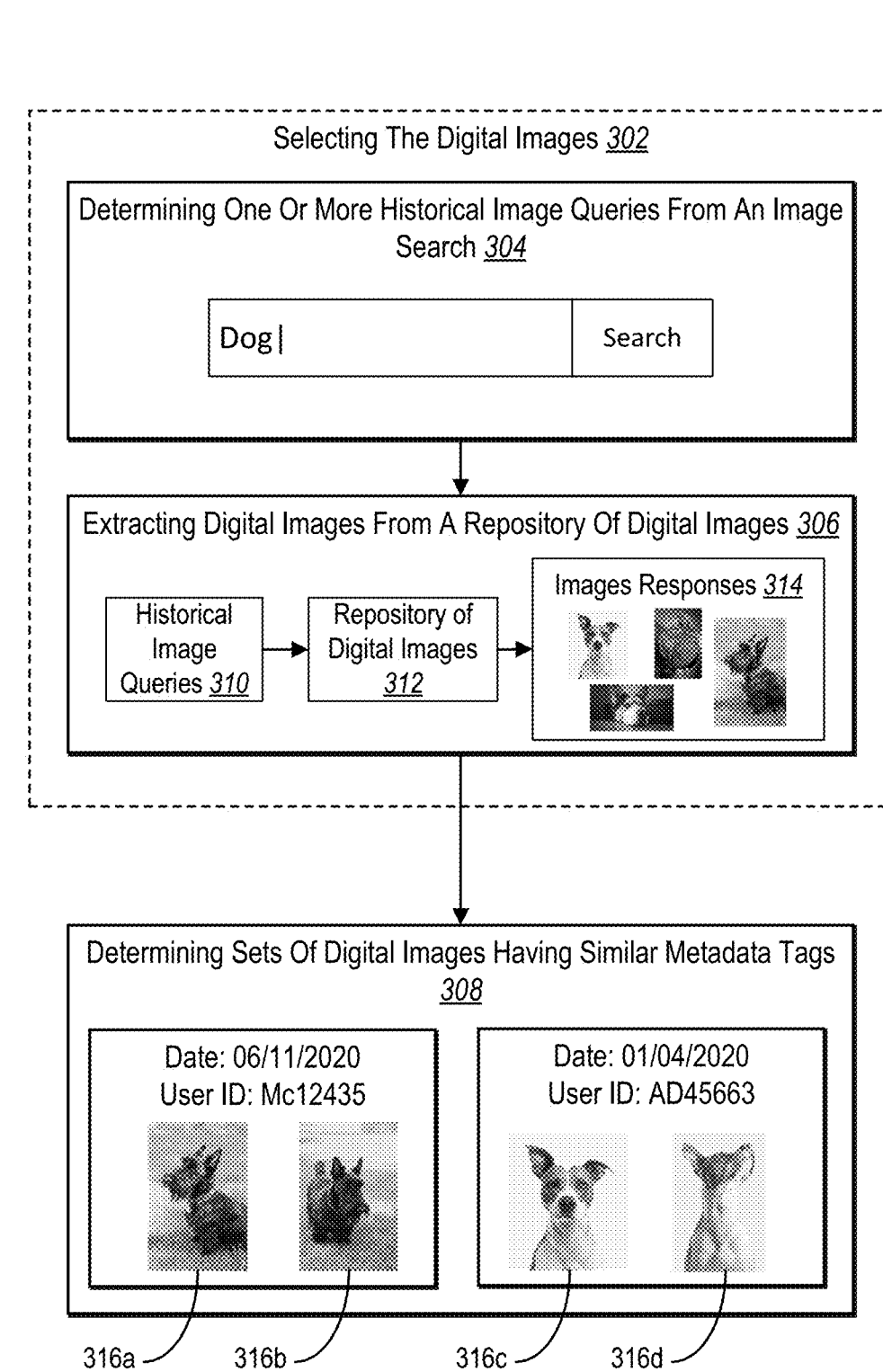
FIG. 3 illustrates an overview diagram of determining sets of images within a series of correlated images in accordance with one or more embodiments of the present disclosure.

In some embodiments, the series of correlated images may be associated with a single user ID, a similar capture date, a similar capture location, or other shared traits. For example, and as illustrated in FIG. 2, the instance extraction system 106 selects a series of correlated images comprising images captured on the same day by a single user. FIG. 3 and the corresponding discussion provide additional detail regarding how the instance extraction system 106 performs stratified sampling and determines sets of digital images having similar metadata tags in accordance with one or more embodiments.

Figure 4:
FIG. 4 illustrates an overview diagram of extracting objects in a series of correlated images in accordance with one or more embodiments of the present disclosure.

As further illustrated in FIG. 2, the series of acts 200 includes the act 204 of extracting objects portrayed in the series of correlated images. Generally, the instance extraction system 106 extracts objects in the series of correlated images to remove image data not associated with identified objects. By isolating the identified objects within the series of correlated images, the instance extraction system 106 reduces the likelihood that background image data will affect the subsequent clustering processes. In some embodiments, the instance extraction system 106 extracts the objects portrayed in the series of correlated images by detecting objects within each image of the series of images by utilizing an object detection model, generating segmentation masks for the detected objects by utilizing a segmentation model, and removing image data not associated with the segmentation masks. For example, and as illustrated in FIG. 2, the instance extraction system 106 isolates the object (e.g., the dog) by removing pixels not associated with the dog. FIG. 4 and the corresponding discussion describe, in greater detail, the instance extraction system 106 removing the image data not associated with the segmentation masks in accordance with one or more embodiments.

The series of acts 200 illustrated in FIG. 2 further includes the act 206 of generating content embeddings and color embeddings for the extracted objects. For instance, a content embedding can include a digital representation of content portrayed in a digital image (e.g., a digital representation of an identifying label or semantic information). In particular, a content embedding can comprise a low-dimensional vector that captures the semantic properties of an object portrayed within a digital image. In one or more embodiments, the instance extraction system 106 generates content embeddings that capture the semantic properties of the detected objects. In one example, the instance extraction system 106 utilizes a convolutional neural network to generate the content embeddings. For example, a content embedding can comprise a 2048-dimensional feature vector generated by a convolutional neural network.

As mentioned previously, the instance extraction system 106 generates color embeddings that indicate cues for lighting and saturation for the detected objects. A color embedding can include a digital representation of colors portrayed. In particular, a color embedding can comprise a low-dimensional representation that indicates lighting and saturation cues of an object portrayed within a digital image. For example, a color embedding can comprise a histogram of pixel values in a color space (e.g., lab space). More specifically, the instance extraction system 106 can generate the color embeddings by grouping pixels of the extracted objects into a plurality of colors to generate color histograms.

As further illustrated in FIG. 2, the series of acts 200 further includes the act 208 of generating object clusters. In some embodiments, the instance extraction system 106 generates the object clusters by combining the content embeddings and the color embeddings and mapping the combined embeddings in a query space. The instance extraction system 106 further utilizes a clustering algorithm to group near similar objects together. For example, a clustering algorithm can include a computer-implemented algorithm utilized to generate clusters (e.g., clusters of data points or media items). A clustering algorithm can comprise a machine learning technique that groups objects. For example, a clustering algorithm can comprise a Density-Based Spatial Clustering of Applications with Noise (DB-SCAN) algorithm or a k-means clustering algorithm.

Figure 5:
FIG. 5 illustrates an overview diagram of generating object clusters in accordance with one or more embodiments of the present disclosure.

As mentioned, in one or more embodiments, the instance extraction system 106 generates object clusters utilizing the clustering algorithm. For example, an object cluster can include a group of objects (or embeddings representing objects). An object cluster can comprise a group of semantically similar objects and their corresponding digital images. An object cluster can comprise similar instances of the same object. In one example, each of the generated object clusters corresponds to digital images portraying the same objects. For example, an object cluster can correspond to digital images portraying similar instances of black dogs, blue cups, or other objects portrayed within digital images. FIG. 5 and the corresponding paragraphs provide additional detail regarding the instance extraction system 106 generating the object clusters in accordance with one or more embodiments.

Figure 6:
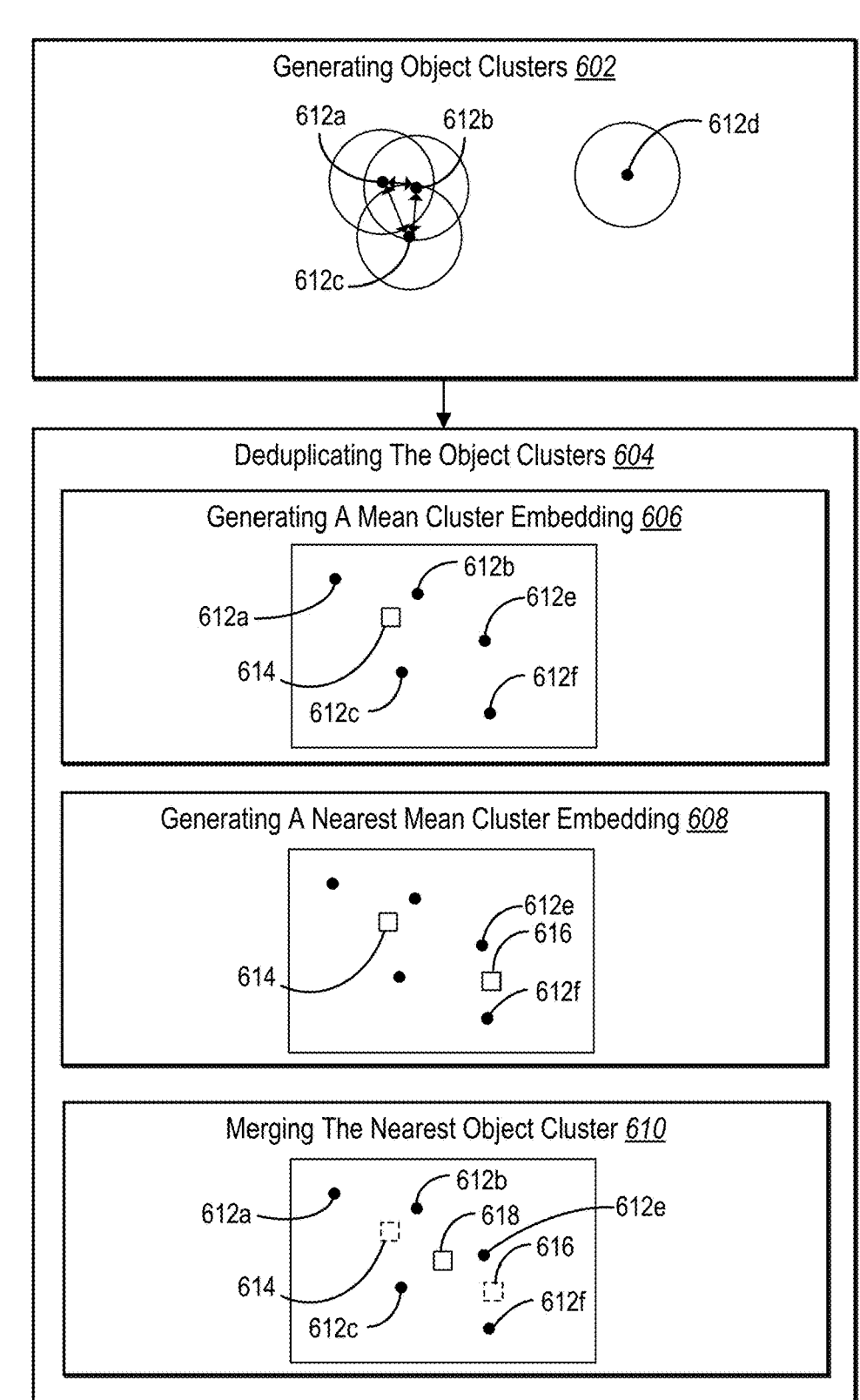
FIG. 6 illustrates an overview of generating and deduplicating object clusters in accordance with one or more embodiments of the present disclosure.

In some embodiments, and as illustrated in FIG. 2, the instance extraction system 106 performs the act 210 of deduplicating the object clusters. In some instances, several object clusters may be associated with the exact same object. For instance, an object cluster in a first series of correlated images can correspond to an object, and an object cluster in a second series of correlated images can correspond to the same object. The instance extraction system 106 performs the act 210 of deduplicating the object clusters to merge clusters corresponding to the same objects. By doing so, the instance extraction system 106 improves the accuracy of resulting training datasets. FIG. 6 and the corresponding discussion provide additional detail relating to the instance extraction system 106 deduplicating object clusters in accordance with one or more embodiments.

Figure 7A:
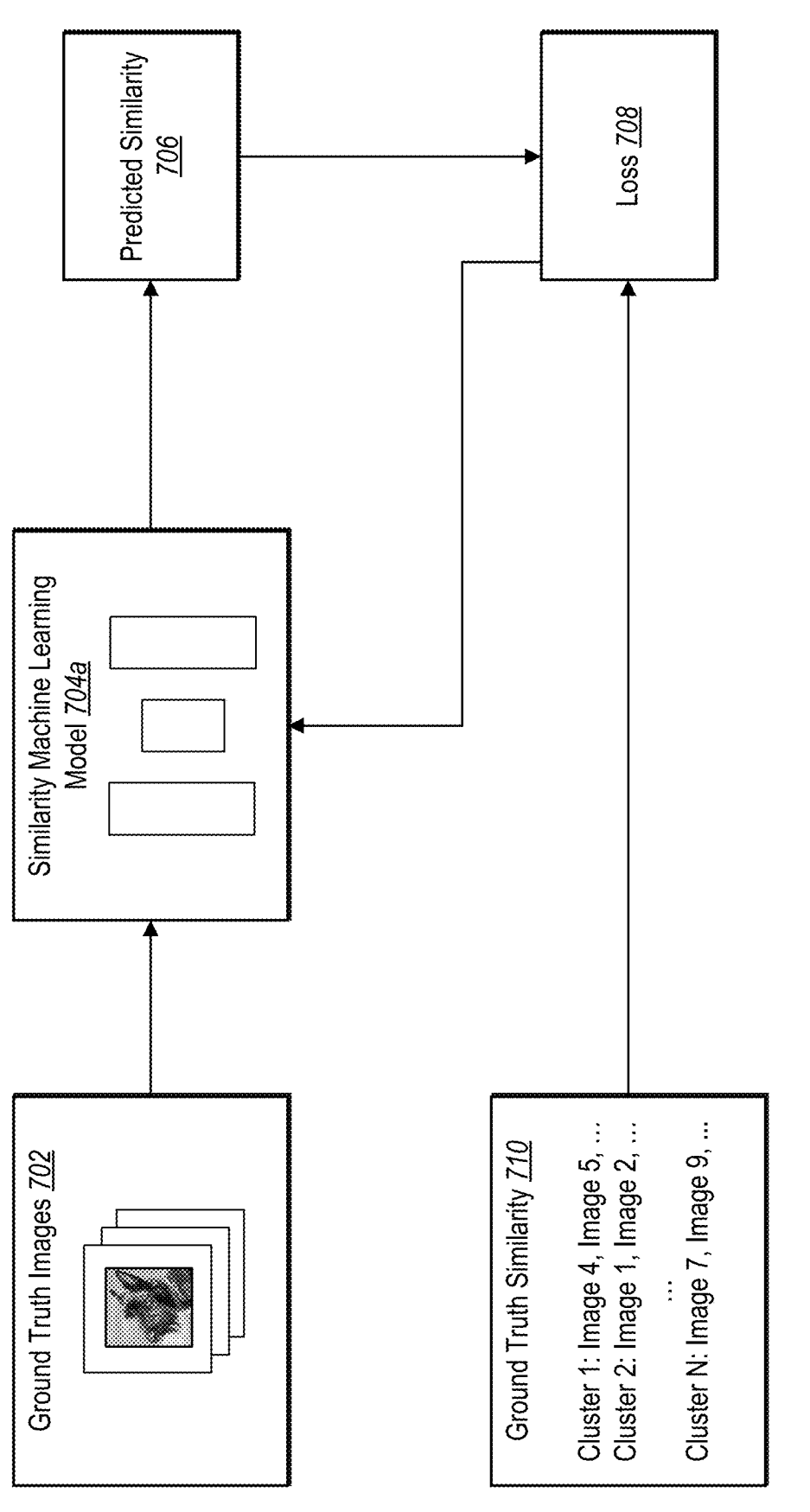
FIGS. 7A-7B illustrate example flowcharts of training and utilizing a digital image similarity machine learning model in accordance with one or more embodiments of the present disclosure.

As illustrated in FIG. 2, the series of acts 200 includes the act 212 of utilizing one or more of the object clusters to build a machine learning model. As mentioned previously, the instance extraction system 106 can utilize one or more of the object clusters to build various types of machine learning models. In one example, the instance extraction system 106 utilizes one or more of the object clusters to build a digital image similarity machine learning model. FIG. 7A and the corresponding paragraphs illustrate how the instance extraction system 106 trains a digital image similarity machine learning model in accordance with one or more embodiments.

FIG. 2 provides an overview of the instance extraction system 106 generating object clusters having similar instances in accordance with some embodiments. The following figures and corresponding paragraphs describe in greater detail how the instance extraction system 106 generates the object clusters. For example, FIG. 3 illustrates the instance extraction system 106 selecting a series of correlated images in accordance with one or more embodiments. In particular, FIG. 3 illustrates a series of acts 300 for determining sets of digital images having similar metadata tags. The series of acts 300 includes an act 302 of selecting the digital images and an act 308 of determining sets of digital images having similar metadata tags.

As illustrated in FIG. 3, the series of acts 300 includes the act 302 of selecting the digital images. Generally, and as mentioned, the instance extraction system 106 utilizes stratified sampling to optimize the volume of digital images to be processed while still preserving variation in the processed images. In particular, the instance extraction system 106 performs the act 302 of selecting the digital images from a repository of digital images. In some embodiments, the instance extraction system 106 performs the act 302 of selecting the digital images from a repository of digital images as part of stratified sampling. For instance, the instance extraction system 106 can select digital images that share common object classes.

In some embodiments, the instance extraction system 106 selects the digital images from a repository of digital images based on shared object keywords. Generally, the instance extraction system 106 can search the repository of digital images utilizing a shared object keyword to identify digital images associated with the shared object keyword (e.g., search image tags for a particular keyword). The instance extraction system 106 can determine a shared object keyword utilizing a variety of methods. For example, the instance extraction system 106 can determine a shared object keyword based on historical image queries, database categories, common object classes, and upload keywords.

As just mentioned, in some embodiments, the instance extraction system 106 utilizes a historical image query as a shared object keyword. To illustrate, in some embodiments, the instance extraction system 106 performs an act 304 of determining one or more historical image queries from an image search. In some embodiments the one or more historical image queries comprise past image search queries entered by one or more users into an image search system. For example, a historical image query can comprise one or more keywords indicating an object class (e.g., "dog," "white flower," etc.), an input image, or other type of image query.

Additionally, or alternatively, the instance extraction system 106 can also perform an act of determining one or more database categories. In particular, the instance extraction system 106 analyzes an image database to determine category names. Generally, database categories comprise a one or more object classes. In one or more embodiments, the instance extraction system 106 accesses predetermined database categories. For example, database categories may include drinks, food, technology, buildings and architecture, technology, animals, people, and other categories.

Furthermore, and as mentioned, shared object keywords can also comprise common object classes. As mentioned, a database category can comprise one or more object classes. For example, the database category of animal can comprise object classes including birds, dolphins, dogs, etc. Thus, the instance extraction system 106 can process object classes to identify common object classes. In one example, the instance extraction system 106 analyzes object classes within a database category to identify the most frequently occurring object classes. The instance extraction system 106 can identify a threshold number of object classes as common object classes.

Additionally, or alternatively, in some embodiments, the instance extraction system 106 designates upload keywords as shared object keywords. For example, upload keywords can include tags or labels uploaded by a user in association with a digital image. For instance, an upload keyword can comprise a user-generated object tag that describes one or more objects within a digital image. The instance extraction system 106 can identify common upload keywords and utilize the common upload keywords as shared object keywords. In some embodiments, the instance extraction system 106 can use any one or a combination of the historical image queries, database categories, common object classes, or the upload keywords as the shared object keywords.

As further illustrated in FIG. 3, the instance extraction system 106 performs the act 306 of extracting digital images from a repository of digital images. Generally, the instance extraction system 106 performs a search of a repository of digital images utilizing the shared object keywords. In particular, the instance extraction system 106 can determine image responses corresponding to the shared object keywords and utilize the image responses as the digital images. For example, the instance extraction system 106 can perform a search of a repository of digital images utilizing a shared object keyword and determine the returned digital images to be the corresponding digital images. Furthermore, in some embodiments, the instance extraction system 106 selects n number of digital images per shared object keyword. For example, the instance extraction system 106 can determine that for each shared object keyword, the instance extraction system 106 will select 1000 digital images.

For example, and as illustrated in FIG. 3, the instance extraction system 106 can perform a search of a repository of digital images 312 utilizing historical image queries 310 to retrieve image responses 314. In some embodiments, the instance extraction system 106 performs a keyword search to retrieve the image responses 314. In one example, the instance extraction system 106 accesses metadata associated with the repository of digital images 312 to identify metadata tags that are similar to the historical image queries 310. Additionally, or alternatively, the instance extraction system 106 utilizes different types of searches to retrieve the image responses 314. For example, the instance extraction system 106 can utilize content-based image retrieval to identify a limited range of visual content or objects within the repository of digital images 312. The instance extraction system 106 can utilize the image responses 314 as the digital images from which the instance extraction system 106 selects the series of correlated images. For example, and as illustrated in FIG. 3, the instance extraction system 106 utilizes the historical image query "dog" to perform a keyword search in the repository of digital images 312. The instance extraction system 106 then utilizes the image responses 314 that return from the keyword search as the digital images from which to select a series of correlated images.

In some embodiments, the instance extraction system 106 periodically performs the act 306 to retrieve up-to-date image responses. In particular, the repository of digital images 312 continually updates to include new digital images. In one example, the instance extraction system 106 determines a time interval and retrieves the image responses 314 based on the determined time interval. For instance, the instance extraction system 106 can retrieve the image responses 314 by performing image searches on the repository of digital images 312 biweekly, monthly, yearly, or at any other predetermined time interval. In some embodiments, the instance extraction system 106 automatically determines the time interval. Additionally, or alternatively, the instance extraction system 106 determines the time interval based on user input.

As illustrated in FIG. 3, the instance extraction system 106 optionally performs the act 302 of selecting the digital images. In particular, in some embodiments, the instance extraction system 106 skips the act 302 altogether and proceeds to the act 308 of determining sets of digital images having similar metadata tags. For example, the instance extraction system 106 can directly select a series of correlated images from a specific dataset. To illustrate, the instance extraction system 106 can receive a group of digital images. The instance extraction system 106 can bypass the act 302 and directly select the series of correlated images from the group of digital images.

The series of acts 300 illustrated in FIG. 3 also includes the act 308 of determining sets of digital images having similar metadata tags. Generally, the instance extraction system 106 identifies loosely correlated images within the digital images based on metadata associated with the digital images. In at least one embodiment, the instance extraction system 106 accesses time, location, and user identification metadata tags. In one example, the instance extraction system 106 utilizes digital images having matching metadata tags as a series of correlated images. For instance, the instance extraction system 106 can utilize digital images having matching date metadata tags, location metadata tags, and/or user ID metadata tags as the series of correlated images. Additionally, or alternatively, the instance extraction system 106 determines the series of correlated images based on metadata tags that are within a similarity threshold of each other. To illustrate, the instance extraction system 106 can determine a subset of digital images having time metadata tags within a threshold time period (e.g., a few hours, a day, etc.) and/or location metadata tags within a threshold distance (e.g., a few feet, a mile, within the same city, etc.). In some embodiments, the instance extraction system 106 utilizes a combination of matching metadata tags and similar metadata tags. In additional embodiments, the instance extraction system 106 utilizes other metadata tags to determine the series of correlated images.

For example, FIG. 3 illustrates two example series of correlated images identified by the instance extraction system 106. In particular, the instance extraction system 106 accesses metadata for the image responses 314 to select the series of correlated images from the image responses 314. As illustrated in FIG. 3, the instance extraction system 106 identifies a first series of correlated images comprising digital images 316a-316b and a second series of correlated images comprising digital images 316c-316d. The instance extraction system 106 determines the first and second series of correlated images based on the digital images 316a-316b and the digital images 316c-316d having similar date and user ID metadata tags. By determining sets of digital images having similar metadata tags, the instance extraction system 106 can enhance the likelihood of grouping images capturing similar or the same instances of objects.

FIG. 3 illustrates the instance extraction system 106 selecting a series of correlated images in accordance with one or more embodiments. As mentioned, the instance extraction system 106 extracts objects in the series of correlated images to reduce the effect of background image data. FIG. 4 and the corresponding discussion provide additional detail of how the instance extraction system 106 extracts objects in the series of correlated images in accordance with one or more embodiments. In particular, FIG. 4 illustrates a series of acts 400 comprising an act 402 of detecting objects in the series of correlated images, an act 404 of generating segmentation masks of the objects, and an act 406 of removing image data not associated with the segmentation masks from the series of correlated images.

The series of acts 400 includes the act 402 of detecting objects in the series of correlated images. In particular, the instance extraction system 106 detects objects in the series of correlated images by utilizing an object detection model. For example, and as illustrated in FIG. 4, the instance extraction system 106 utilizes an object detection model 410 to generate bounding boxes 412a-412b indicating objects in a digital image 408. In some embodiments, the object detection model 410 comprises an object detection machine learning model trained on classes from training datasets. For example, the object detection machine learning model 410 can comprise a You Only Look Once (YOLO) algorithm, a convolutional network (e.g., fast R-CNN, R-FCN, etc.), a Single Shot Detector (SSD), or other type of trained machine learning model. Additionally, in some embodiments, the instance extraction system 106 utilizes the object detection model 410 to detect objects within the entire repository of digital images and not just the series of correlated images.

As further illustrated in FIG. 4, the instance extraction system 106 performs the act 404 of generating segmentation masks of the objects. In particular, the instance extraction system 106 generates segmentation masks of the objects in the series of correlated images by utilizing a segmentation model. For example, and as illustrated in FIG. 4, the instance extraction system 106 utilizes a segmentation model 414 to generate segmentation masks 416a-416b of the objects indicated by the bounding boxes 412a-412b. Generally, the segmentation model 414 partitions the area within the bounding boxes 412a-412b to isolate the identified object. In one or more embodiments, the segmentation model 414 comprises a salient object segmentation network that generates the segmentation masks 416a-416b of the objects. Although the instance extraction system 106 can utilize a variety of segmentation models, in one or more embodiments, the instance extraction system 106 utilizes a salient content neural network to segment foreground and background pixels in a digital image (e.g., as described in U.S. patent application Ser. No. 15/799,395, filed on Oct. 31, 2017, entitled DEEP SALIENT CONTENT NEURAL NETWORKS FOR EFFICIENT DIGITAL OBJECT SEGMENTATION, the contents of which are expressly incorporated herein by reference).

The series of acts 400 includes the act 406 of removing image data not associated with the segmentation masks from the series of correlated images. In particular, the instance extraction system 106 removes image data not associated with the segmentation masks to generate extracted objects. As illustrated, the instance extraction system 106 generates extracted objects 418a-418b. In particular, in some embodiments, the instance extraction system 106 generates a background masks by inverting the segmentation masks 416a-416b. The instance extraction system 106 applies the background masks to the digital image 408 to generate the extracted objects 418a-418b. As illustrated in FIG. 4, the instance extraction system 106 can identify and isolate several objects within the same digital image. For example, the instance extraction system 106 generates the extracted object 418a and the extracted object 418b, which are both identified in the digital image 408. Additionally, or alternatively, the instance extraction system 106 identifies a single salient object within the digital image 408 and generates a single object for the digital image.

FIG. 4 and the corresponding paragraphs provide detail relating to the instance extraction system 106 extracting objects from the series of correlated digital images in accordance with one or more embodiments. As discussed previously, the instance extraction system 106 generates object clusters for the extracted objects by grouping semantically similar objects based on content embeddings and color embeddings. FIG. 5 and the related discussion describe, in greater detail, a series of acts the instance extraction system 106 performs as part of mapping combined color and content embeddings into a query space in accordance with one or more embodiments. In particular, FIG. 5 illustrates a series of acts 500 comprising an act 502 of generating content embeddings, an act 504 of generating color embeddings, an act 506 of generating combined embeddings, and an act 508 of mapping the combined embeddings in a query space.

As illustrated in FIG. 5, the series of acts 500 includes the act 502 of generating content embeddings. Generally, and as mentioned, the content embeddings capture the semantic properties of the detected object. In particular, the instance extraction system 106 generates the content embeddings by generating feature vectors from extracted objects by utilizing a convolutional neural network (CNN) trained to generate semantic image labels and utilizing the feature vectors as the content embeddings to generate the object clusters. For instance, and as illustrated in FIG. 5, the instance extraction system 106 utilizes a convolutional neural network 512 to generate a feature vector 514 from an extracted object 510. In at least one embodiment, the feature vector 514 comprises an n-dimensional (e.g., 2048-dimensional) vector that captures the semantic properties of the extracted object 510.

Additionally, or alternatively, the instance extraction system 106 utilizes different methods to generate content embeddings. For example, the instance extraction system 106 can generate semantic labels corresponding to an object within a digital image and generate a content embedding based on the semantic labels. Furthermore, the instance extraction system 106 can train a content embedding machine learning model to predict similar content within digital images. The instance extraction system 106 can utilize predicted similarities generated utilizing the content embedding machine learning model as the content embeddings.

Additionally, or alternatively, in one or more embodiments, the instance extraction system 106 trains the convolutional neural network 512 to generate semantic image labels. For example, in one or more embodiments, the instance extraction system 106 trains the convolutional neural network 512 to generate image-level labels for the series of correlated images. The convolutional neural network 512 can differentiate between semantic concepts like dog, cat, apple, orange, etc.

FIG. 5 further illustrates the act 504 of generating color embeddings. Generally, the color embedding indicates cues for lighting and saturation of the extracted object. In particular, the instance extraction system 106 generates color embeddings by grouping pixels of the extracted objects into a plurality of colors to generate color histograms and utilizing the color histograms as the color embeddings to generate the object clusters. Color histograms generally comprise graphical representations showing how frequently various colors occur within an object. As illustrated in FIG. 5, the instance extraction system 106 generates a color histogram 516 based on pixels of the extracted object 510. In one example, the instance extraction system 106 generates the color histogram 516 by assigning colors in the object into a number of color bins and counting the number of pixels in each color bin. The instance extraction system 106 can further determine the proportion of total pixels within each color bin to create the color histogram 516. In some embodiments, the color histogram 516 is in a lab color space. In one or more other embodiments, the color histogram 516 is in different color spaces such as an RGB, rg chromaticity, or another color space of any dimension.

As illustrated in FIG. 5, the instance extraction system 106 performs the act 506 of generating combined embeddings. In particular, the act 506 comprises combining the content embeddings and the color embeddings for the extracted objects. In some embodiments, the instance extraction system 106 combines the embeddings by associating the color embedding with the corresponding content embedding. For example, the instance extraction system 106 can perform the act 506 by concatenating, adding, or multiplying the content embeddings and the color embeddings.

As illustrated in FIG. 5, the instance extraction system 106 performs the act 508 of mapping the combined embeddings in a query space. For example, the instance extraction system 106 can map the combined content embeddings for the extracted objects in an n-dimensional query space, where n equals the number of features. As illustrated in FIG. 5, the instance extraction system 106 maps combined embeddings 518a-518d in a query space. Each of the combined embeddings 518a-518d corresponds to an extracted object. In one or more embodiments, the instance extraction system 106 performs the act 508 by utilizing a projection operation to project the color embeddings, the content embeddings, or the combined embeddings to a feature space. Alternatively, the instance extraction system 106 can utilize the content embeddings, the color embeddings, or the combined embeddings themselves as coordinates within the feature space.

FIG. 5 illustrates a series of acts the instance extraction system 106 performs as part of mapping combined embeddings in a query space in accordance with one or more embodiments. As discussed previously, the instance extraction system 106 also generates object clusters and deduplicates object clusters in the query space. FIG. 6 illustrates a series of acts that the instance extraction system 106 performs to generate and deduplicate object clusters in accordance with one or more embodiments. In particular, FIG. 6 illustrates a series of acts 600 including an act 602 of generating object clusters and an act 604 of deduplicating the object clusters.

As illustrated in FIG. 6, the instance extraction system 106 performs the act 602 of generating object clusters. In particular, the instance extraction system 106 generates object clusters by grouping semantically similar objects from the content embeddings and the color embeddings utilizing a clustering algorithm in the query space. In some embodiments, the instance extraction system 106 utilizes a density-based clustering algorithm such as Density-Based Spatial Clustering of Applications with Noise (DBSCAN) clustering. Furthermore, because the instance extraction system 106 utilizes the clustering algorithm to generate object clusters for objects within a series of correlated images, the instance extraction system 106 deals with limited noise and variation. By utilizing the clustering algorithm, the instance extraction system 106 groups near similar extracted objects together and can, in an unsupervised manner, extract similar instance objects while also disregarding outlier objects. In one or more embodiments, the instance extraction system 106 generates at least one clean object cluster per series of correlated images.

For example, and as illustrated in FIG. 6, the instance extraction system 106 maps extracted objects 612a-612d into a query space. In the example illustrated in FIG. 6, the instance extraction system 106 utilizes DBSCAN clustering to group semantically similar objects. Generally, the instance extraction system 106 groups together points that are in close proximity to each other while marking points that lie alone in low-density regions as outliers. The instance extraction system 106 determines an Epsilon parameter comprising a radius of a circle created around each of the extracted objects 612a-612d. Additionally, the instance extraction system 106 determines a minPoints value comprising the minimum number of data points required to be inside the circle for the extracted object to be classified as a core point. In some embodiments, the instance extraction system 106 determines the minPoints value to equal ten to twenty extracted objects per cluster. As illustrated in FIG. 6, both the extracted objects 612a and 612c are within the circle corresponding to the extracted object 612b defined by the Epsilon parameter. In this example, the instance extraction system 106 determines the minPoints value to equal two, and because more than two points (including the extracted object 612b) are within the circle corresponding to the extracted object 612b, the instance extraction system 106 identifies the extracted object 612b as a core point. Thus, and as illustrated, the instance extraction system 106 groups the extracted objects 612a-612c as an object cluster. As further illustrated in FIG. 6, the instance extraction system 106 determines that the extracted object 612d is an outlier.

The series of acts 600 illustrated in FIG. 6 also includes the act 604 of deduplicating the object clusters. Generally, an instance of an object may appear in several series of correlated images. For instance, the same white dog may appear in a first series of correlated images and a second series of correlated images. Duplicate object clusters have negative effects on training—more particularly during negative sampling. Thus, the instance extraction system 106 performs the act 604 of deduplicating the object clusters to merge object clusters corresponding to similar instances of the same object. In particular, the act 604 includes an act 606 of generating a mean cluster embedding, an act 608 of generating a nearest mean cluster embedding, and an act 610 of merging the nearest object cluster.

As illustrated in FIG. 6, the instance extraction system 106 performs the act 606 of generating a mean cluster embedding. In particular, the instance extraction system 106 generates a mean cluster embedding for an object cluster of the object clusters. For example, and as illustrated in FIG. 6, the instance extraction system 106 determines a mean cluster embedding 614 for the extracted objects 612a-612c within the first object cluster. In some embodiments, the instance extraction system 106 generates the mean cluster embedding by summing the combined embeddings for extracted objects within an object cluster and dividing the sum by the number of extracted objects within the object cluster.

As illustrated in FIG. 6, the instance extraction system 106 further performs the act 608 of generating a nearest mean cluster embedding. In particular, the instance extraction system 106 generates a nearest mean cluster embedding for a nearest object cluster. In some embodiments, the nearest object cluster comprises an object cluster from the same series of correlated images. In yet other embodiments, the nearest object cluster comprises an object cluster from a different series of correlated images. In any case, the instance extraction system 106 generates a nearest mean cluster embedding by determining a mean embedding for all extracted objects within the nearest object cluster. To illustrate, the instance extraction system 106 identifies the nearest object cluster comprising the extracted objects 612e-612f. The instance extraction system 106 generates a nearest mean cluster embedding 616 for the nearest object cluster.

The series of acts 600 illustrated in FIG. 6 further comprises the act 610 of merging the nearest object cluster. In particular, the instance extraction system 106 merges the nearest object cluster with the object cluster based on a distance between the nearest mean cluster embedding and the mean cluster embedding falling within a threshold distance value. In particular, the instance extraction system 106 determines a threshold distance value within which the instance extraction system 106 determines to merge two nearest object clusters. The instance extraction system 106 can automatically determine the threshold distance value or determine the threshold distance value based on user input. For example, and as illustrated in FIG. 6, the instance extraction system 106 determines that the mean cluster embedding 614 and the nearest mean cluster embedding 616 are within a threshold distance value of each other. Thus, the instance extraction system 106 determines to merge the object cluster corresponding to the extracted objects 612a-612c with the nearest object cluster corresponding to the extracted objects 612e-612f.

In some embodiments, the instance extraction system 106 iteratively performs the acts 606-610. In particular, the instance extraction system 106 calculates a combined mean cluster embedding 618 for the combined object cluster and nearest object cluster. The instance extraction system 106 then determines an additional distance between the combined mean cluster embedding 618 with additional nearest mean cluster embeddings. The instance extraction system 106 compares the additional distance with the threshold distance value. Based on the additional distance falling within the threshold distance value, the instance extraction system 106 further combines the combined object cluster and the nearest object cluster with the additional nearest object cluster. The instance extraction system 106 iteratively merges object clusters until distances between mean cluster embeddings of the object clusters exceed the threshold distance value.

Figure 7B:
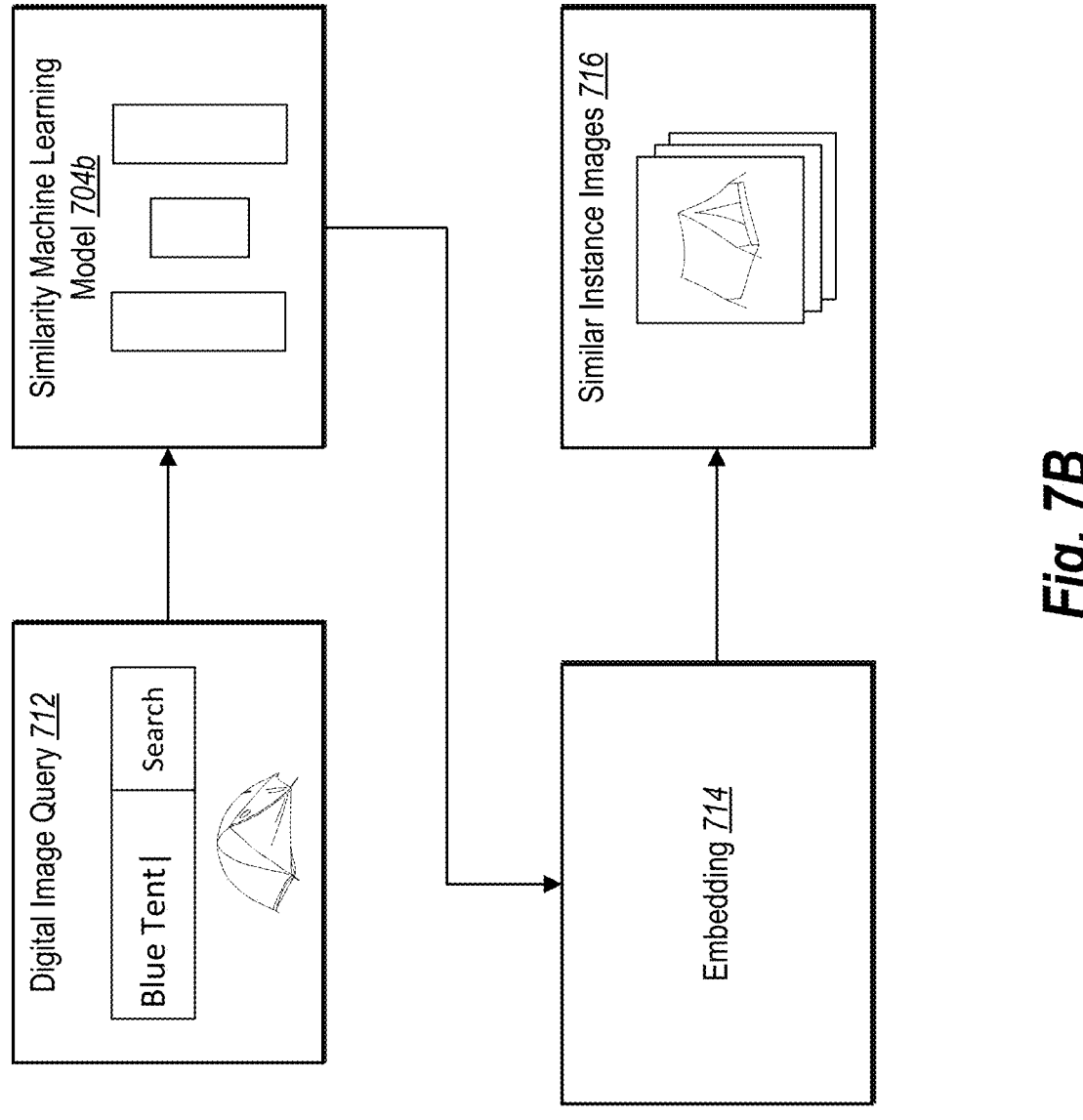

FIG. 6 and the corresponding discussion illustrate a series of acts the instance extraction system 106 performs as part of deduplicating object clusters in accordance with one or more embodiments. As described previously, the instance extraction system 106 can utilize object clusters to build a machine learning model. FIGS. 7A and 7B and the corresponding paragraphs further describe how the instance extraction system 106 utilizes one or more of the object clusters to train and utilize a digital image similarity machine learning model (or simply "similarity machine learning model") in accordance with one or more embodiments. In particular, FIG. 7A includes a flow chart illustrating the instance extraction system 106 training a similarity machine learning model in accordance with one or more embodiments. FIG. 7B includes a flow chart illustrating the instance extraction system 106 implementing the trained similarity machine learning model to determine similar instance images in accordance with one or more embodiments.

As an overview of FIG. 7A, the instance extraction system 106 utilizes one or more of the deduplicated object clusters to train a similarity machine learning model, such as a convolutional neural network, to predict the similarity between digital images. In one or more embodiments, the instance extraction system 106 processes ground truth images 702 utilizing a similarity machine learning model 704a, which generates a predicted similarity 706 between the ground truth images 702. The instance extraction system 106 adjusts parameters of the similarity machine learning model 704a to reduce a loss 708 between the predicted similarity 706 and a ground truth similarity 710.

As illustrated in FIG. 7A, the instance extraction system 106 trains the similarity machine learning model 704a utilizing the ground truth images 702. In particular, the ground truth images 702 comprise digital images that correspond to one or more object clusters. In one example, the ground truth images 702 comprise a pair of ground truth similar images from an object cluster. Accordingly, in this example, the ground truth images 702 are digital images that are known to be semantically similar.

As illustrated in FIG. 7A, the instance extraction system 106 utilizes the similarity machine learning model 704a to generate the predicted similarity 706. Generally, the instance extraction system 106 predicts similarities between the input ground truth images 702. For instance, if the instance extraction system 106 inputs the pair of ground truth similar images from an object cluster, the instance extraction system 106 utilizes the similarity machine learning model 704a to generate a predicted similarity between the pair of ground truth similar images. In some embodiments, the predicted similarity 706 comprises a difference between predicted digital image embeddings for a pair of ground truth similar images. In particular, the instance extraction system 106 utilizes the similarity machine learning model 704a to generate predicted digital image embeddings corresponding to the ground truth images 702.

As suggested above, in certain embodiments, the instance extraction system 106 determines the loss 708 between the predicted similarity 706 and the ground truth similarity 710. As illustrated in FIG. 7A, the instance extraction system 106 compares the predicted similarity. 706 with the ground truth similarity 710 utilizing a loss function (e.g., a means squared error loss). Additionally, the instance extraction system 106 adjusts parameters of the similarity machine learning model 704a to reduce the loss 708. In at least one example, the instance extraction system 106 adjusts the parameters of the similarity machine learning model 704a to generate the same (or similar) predicted digital image embeddings for a pair of ground truth similar images that, as indicated by the ground truth similarity 710, are within the same object cluster. Furthermore, the instance extraction system 106 adjusts the parameters of the similarity machine learning model 704a to generate predicted image embeddings that are far apart for a pair of ground truth images that, as indicated by the ground truth similarity 710, are in different object clusters.

Additionally, or alternatively, in some embodiments, the instance extraction system 106 utilizes the ground truth images 702 to build an object classification machine learning model. In particular, the instance extraction system 106 inputs the ground truth images 702 into an object classification machine learning model. The instance extraction system 106 utilizes the object classification machine learning model to generate predicted instance labels and confidence scores corresponding to the predicted instance labels. The predicted instance labels comprise object tags identifying objects within the ground truth images 702. The instance extraction system 106 compares the predicted instance labels with ground truth instance labels to generate a loss. The instance extraction system 106 modifies parameters of the object classification machine learning model to reduce the loss between the predicted instance labels and the ground truth instance labels.

In some embodiments, the instance extraction system 106 generates ground truth instance labels corresponding to the ground truth images 702. The instance extraction system 106 can utilize a variety of methods to generate the ground truth instance labels. For example, the instance extraction system 106 can present digital images corresponding to an object cluster to a user and receive human-generated labels for the digital images. In another example, the instance extraction system 106 utilizes metadata tags associated with the digital images within an object cluster to associate a ground truth instance label with the ground truth images linked with an object cluster. More specifically, the instance extraction system 106 can select the most frequently appearing metadata tags indicating content and color as the ground truth instance label for ground truth images. In any case, the instance extraction system 106 generates ground truth instance labels associated with the ground truth images 702.

While FIG. 7A illustrates the instance extraction system 106 training a similarity machine learning model in accordance with one or more embodiments, FIG. 7B illustrates a flowchart of the instance extraction system 106 utilizing the similarity machine learning model in accordance with one or more embodiments. In particular, FIG. 7B illustrates the instance extraction system 106 utilizing the similarity machine learning model to generate a plurality of digital embeddings for use in responding to digital image queries in accordance with one or more embodiments. In particular, FIG. 7B illustrates the instance extraction system 106 inputting a digital image query 712 into the similarity machine learning model 704b. The instance extraction system 106 utilizes the similarity machine learning model 704b to generate an embedding 714 for the digital image query 712. Based on comparing the embedding 714 with a plurality of digital image embeddings, the instance extraction system 106 identifies similar instance images 716.

As mentioned, the instance extraction system 106 utilizes the digital image query 712 as input into the similarity machine learning model 704b. In particular, the instance extraction system 106 receives, from a client device associated with a user, the digital image query 712 identifying an object or an instance of an object (e.g., "blue tent"). In some embodiments, the digital image query 712 comprises a text input. In yet other embodiments, the digital image query 712 comprises a digital image containing an object of interest (e.g., an image portraying a blue tent).

Additionally, the instance extraction system 106 processes a plurality of digital images utilizing the similarity machine learning model 704b. In In some embodiments, the instance extraction system 106 selects the plurality of digital images based on user input. For instance, a user may input the plurality of digital images that the user wants to search for particular instances of objects. In yet other embodiments, the instance extraction system 106 automatically determines the plurality of digital images. For instance, the instance extraction system 106 can automatically process all digital images within a repository of digital images utilizing the similarity machine learning model 704b.

The instance extraction system 106 processes the digital image query 712 utilizing the similarity machine learning model 704b. In particular, the instance extraction system 106 utilizes the similarity machine learning model 704b to generate the embedding 714 for the digital image query 712. In some embodiments, the instance extraction system 106 compares the embedding 714 with the plurality of digital image embeddings to identify the similar instance images 716. In one example, the instance extraction system 106 identifies digital image embeddings of the plurality of digital image embeddings that are within a threshold similarity range of the embedding 714. Based on determining the digital image embeddings, the instance extraction system 106 identifies similar instance images corresponding to the digital image query 712.

As mentioned previously, the instance extraction system 106 can also utilize a trained object classification machine learning model to generate instance labels for objects portrayed in a plurality of images. In particular, in some embodiments, the instance extraction system 106 inputs a plurality of digital images into the object classification machine learning model. The instance extraction system 106 utilize the object classification machine learning model to generate predicted instance labels for objects portrayed in the plurality of images. For instance, the instance extraction system 106 can utilize the object classification machine learning model to generate predicted instance labels indicating the color and/or content of the plurality of images.

Figure 8:
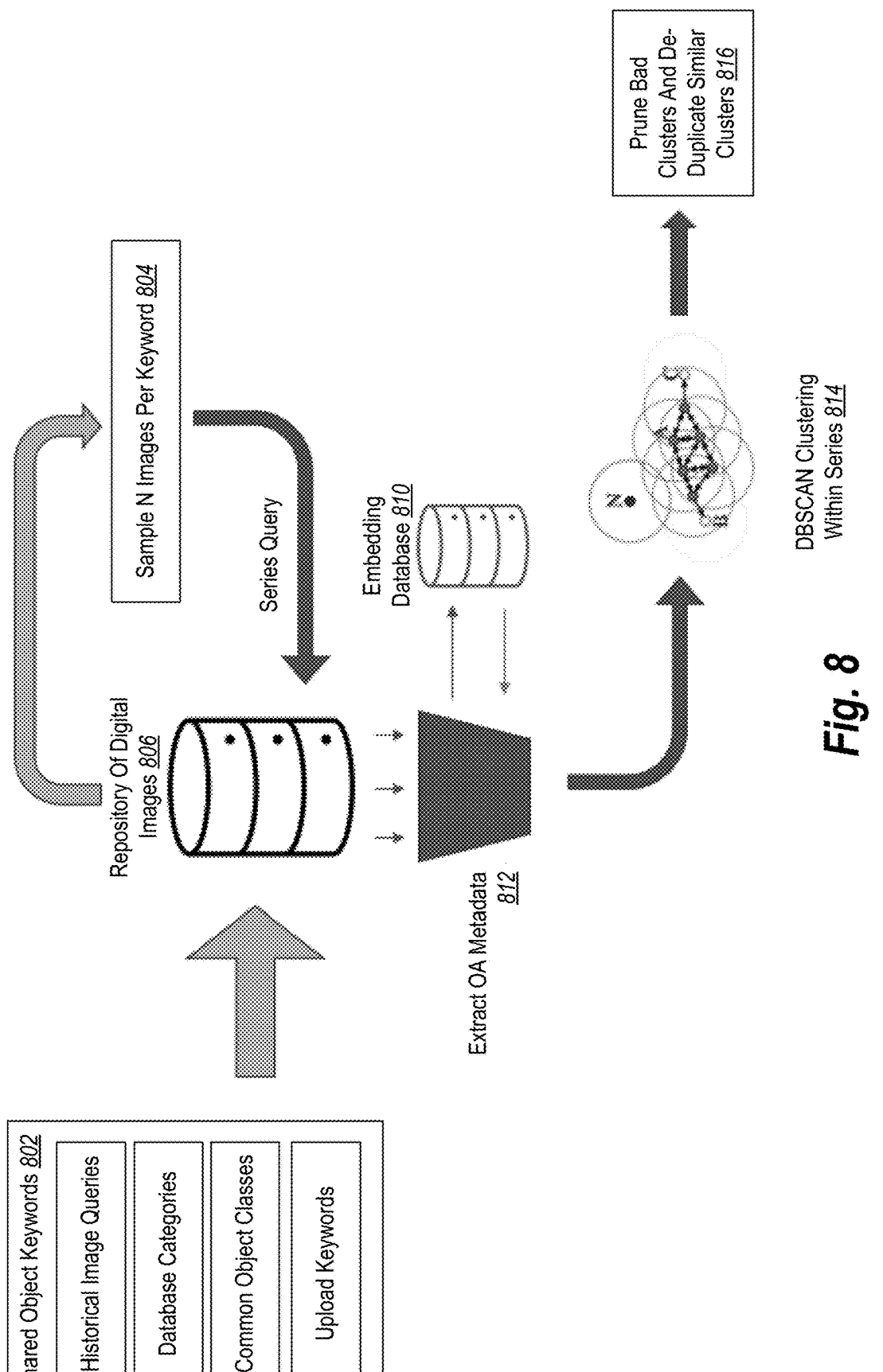
FIG. 8 illustrates an overview of the instance extraction system generating one or more clusters having semantically similar digital images in accordance with one or more embodiments of the present disclosure.

FIGS. 1-7B illustrate the instance extraction system 106 performing various acts as part of generating object clusters corresponding to similar instance images in accordance with one or more embodiments. FIG. 8 illustrates an example flowchart of the instance extraction system 106 generating object clusters in accordance with at least one embodiment. In particular, FIG. 8 illustrates a flowchart including various components and actions that the instance extraction system 106 utilizes to generate one or more object clusters. To illustrate, FIG. 8 includes shared object keywords 802 that the instance extraction system 106 utilizes to perform an act 804 of extracting digital images from a repository of digital images 806. In particular, and as illustrated in FIG. 8, the instance extraction system 106 can sample N number of digital images per shared object keyword.

As illustrated in FIG. 8, the shared object keywords 802 comprises one or more of historical image queries, database categories, common object classes, or upload keywords to select digital images from a repository of digital images 806. In one or more embodiments, and as illustrated in FIG. 8, the shared object keywords 802 can comprise a number of keyword sources. For instance, the instance extraction system 106 can access database categories applicable to a repository of digital images and then utilize these database categories to select the digital images. The instance extraction system 106 may also utilize common object classes to select the digital images. The instance extraction system 106 can further utilize historical image queries utilized to select the digital images from the repository of digital images 806. Additionally, or alternatively, the instance extraction system 106 utilizes upload keywords utilized to upload digital images to select the digital images. In some embodiments, the repository of digital images 806 comprises a database of digital images and corresponding metadata.

The instance extraction system 106 further performs sampling acts 812 to select a series of one or more correlated images. In particular, and as illustrated, the instance extraction system 106 extracts metadata from the digital and organizes the digital images by assigning the digital images into series of correlated images based on the metadata. Furthermore, the instance extraction system 106 extracts the objects within the series digital images and generates content and color embeddings for the objects within the series of digital images. As further illustrated, the instance extraction system 106 stores the content embeddings and the color embeddings in the embedding database 810. The embedding database 810 comprises a secondary database that stores all features for clustering.

As further illustrated in FIG. 8, the instance extraction system 106 utilizes a clustering algorithm to generate object clusters 814. For instance, and as illustrated, the instance extraction system 106 utilizes DBSCAN clustering to generate one or more object clusters for each series of correlated images. Furthermore, as illustrated in FIG. 8, the instance extraction system 106 performs deduplication acts 816 to merge clusters corresponding to the same or similar instances of objects.

Figure 9:
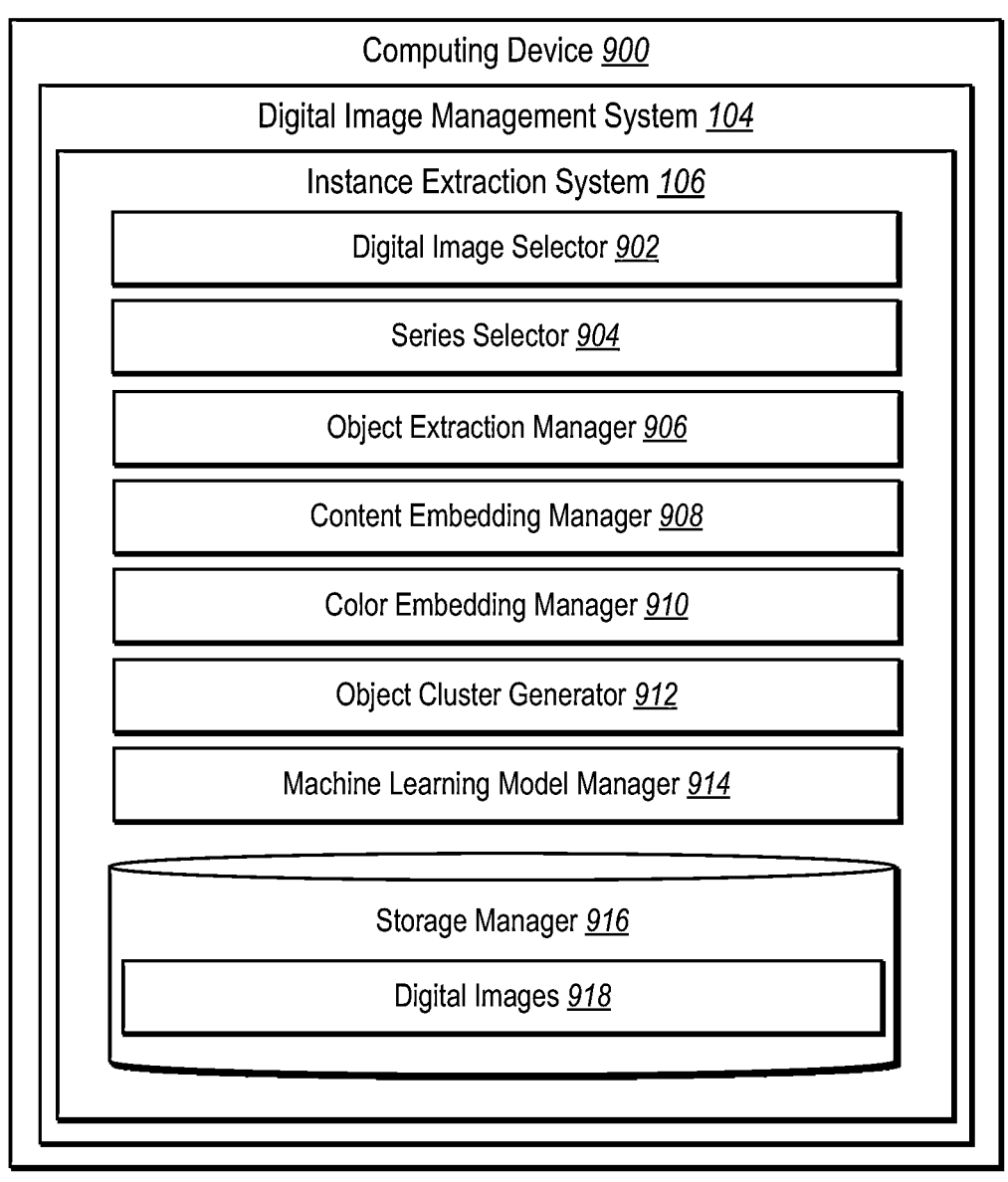
FIG. 9 illustrates a schematic diagram of an example architecture of the instance extraction system in accordance with one or more embodiments of the present disclosure.

FIG. 9 provides additional detail regarding various components and capabilities of the instance extraction system 106 in accordance with one or more embodiments. Generally, FIG. 9 illustrates the instance extraction system 106 implemented by the digital image management system 104 on a computing device 900 (e.g., the user client device 108 and/or the server device(s) 102). As shown, the instance extraction system 106 can include, but is not limited to, a digital image selector 902, a series selector 904, an object extraction manager 906, a content embedding manager 908, a color embedding manager 910, an object cluster generator 912, a machine learning model manager 914, and a storage manager 916. In some embodiments, the instance extraction system 106 is implemented as part of the digital image management system 104 in a distributed system of the server devices for generating object clusters. Additionally, or alternatively, the instance extraction system 106 is implemented on a single computing device such as the server device(s) 102 of FIG. 1.

In one or more embodiments, each of the components of the instance extraction system 106 are in communication with one another using any suitable communication technologies. Additionally, the components of the instance extraction system 106 can be in communication with one or more other devices including the user client device 108 illustrated in FIG. 1. Although the components of the instance extraction system 106 are shown as separate in FIG. 9, any of the subcomponents may be combined into fewer components, such as into a single component or divided into more components as may serve a particular implementation. Furthermore, although the components of FIG. 9 are described in connection with the instance extraction system 106, at least some components for performing operations in conjunction with the instance extraction system 106 described herein may be implemented on other devices within the environment.

The components of the instance extraction system 106 can include software, hardware, or both. For example, the components of the instance extraction system 106 can include one or more instructions stored on a computer-readable storage medium and executable by processors of one or more computing devices (e.g., the user client device 108). When executed by the one or more processors, the computer-executable instructions of the instance extraction system 106 can cause the computing devices to perform the object clustering methods described herein. Alternatively, the components of the instance extraction system 106 can comprise hardware, such as a special purpose processing device to perform a certain function or group of functions. Additionally, or alternatively, the components of the instance extraction system 106 can include a combination of computer-executable instructions and hardware.

Furthermore, the components of the instance extraction system 106 performing the functions described herein with respect to the instance extraction system 106 may, for example, be implemented as part of a stand-alone application, as a module of an application, as a plug-in for applications, as a library function or functions that may be called by other applications, and/or as a cloud-computing model. Thus, the components of the instance extraction system 106 may be implemented as part of a stand-alone application on a personal computing device or a mobile device. Alternatively, or additionally, the components of the instance extraction system 106 may be implemented in any application that provides image management, including, but not limited to ADOBE STOCK or ADOBE PHOTOSHOP. The foregoing are either registered trademarks or trademarks of Adobe Inc. in the United States and/or other countries.

The instance extraction system 106 includes the digital image selector 902. In particular, the digital image selector 902 selects digital images from a repository of digital images. More specifically, the digital image selector 902 utilizes historical image queries to select the digital images from which the instance extraction system 106 selects series of correlated images.

As further illustrated in FIG. 9, the instance extraction system 106 includes the series selector 904. In particular, the series selector 904 selects series of correlated images from digital images. In one or more embodiments, the series selector 904 selects the series of correlated images based on metadata tags associated with the series of correlated images.

The instance extraction system 106 illustrated in FIG. 9 also includes the object extraction manager 906. In particular, the object extraction manager 906 extracts objects from the series of correlated images. In some embodiments, the object extraction manager 906 extracts objects from all digital images within the repository of digital images. The object extraction manager 906 can detect objects in digital images by utilizing an object detection model, generate segmentation masks of the objects, and remove image data not associated with the segmentation masks by generating a background mask.

The instance extraction system 106 also includes the content embedding manager 908. In some embodiments, the content embedding manager 908 generates feature vectors for extracted objects by utilizing a convolutional neural network trained to generate semantic image labels.

The instance extraction system 106 illustrated in FIG. 9 also includes the color embedding manager 910. In one or more embodiments, the color embedding manager 910 groups pixels of extracted objects into a plurality of colors to generate color histograms.

The instance extraction system 106 includes the object cluster generator 912. The object cluster generator 912 generates object clusters by grouping semantically similar objects from the content embeddings and the color embeddings utilizing a clustering algorithm by mapping combined embeddings in a query space. The object cluster generator 912 can also deduplicate object clusters.

The instance extraction system 106 illustrated in FIG. 9 further includes the machine learning model manager 914. The machine learning model manager 914 trains and applies machine learning models. In particular, the machine learning model manager 914 can manage digital image similarity machine learning models, object classification machine learning models, and other types of machine learning models utilized by the instance extraction system 106. More specifically, the machine learning model manager 914 trains machine learning models by utilizing one or more object clusters.

The instance extraction system 106 also includes the storage manager 916. The storage manager 916 stores digital images 918 via one or more memory devices. In particular, the digital images 918 comprise digital images received and processed by the instance extraction system 106. In one or more embodiments, the digital images 918 also includes metadata corresponding to stored digital images.

Figure 10:
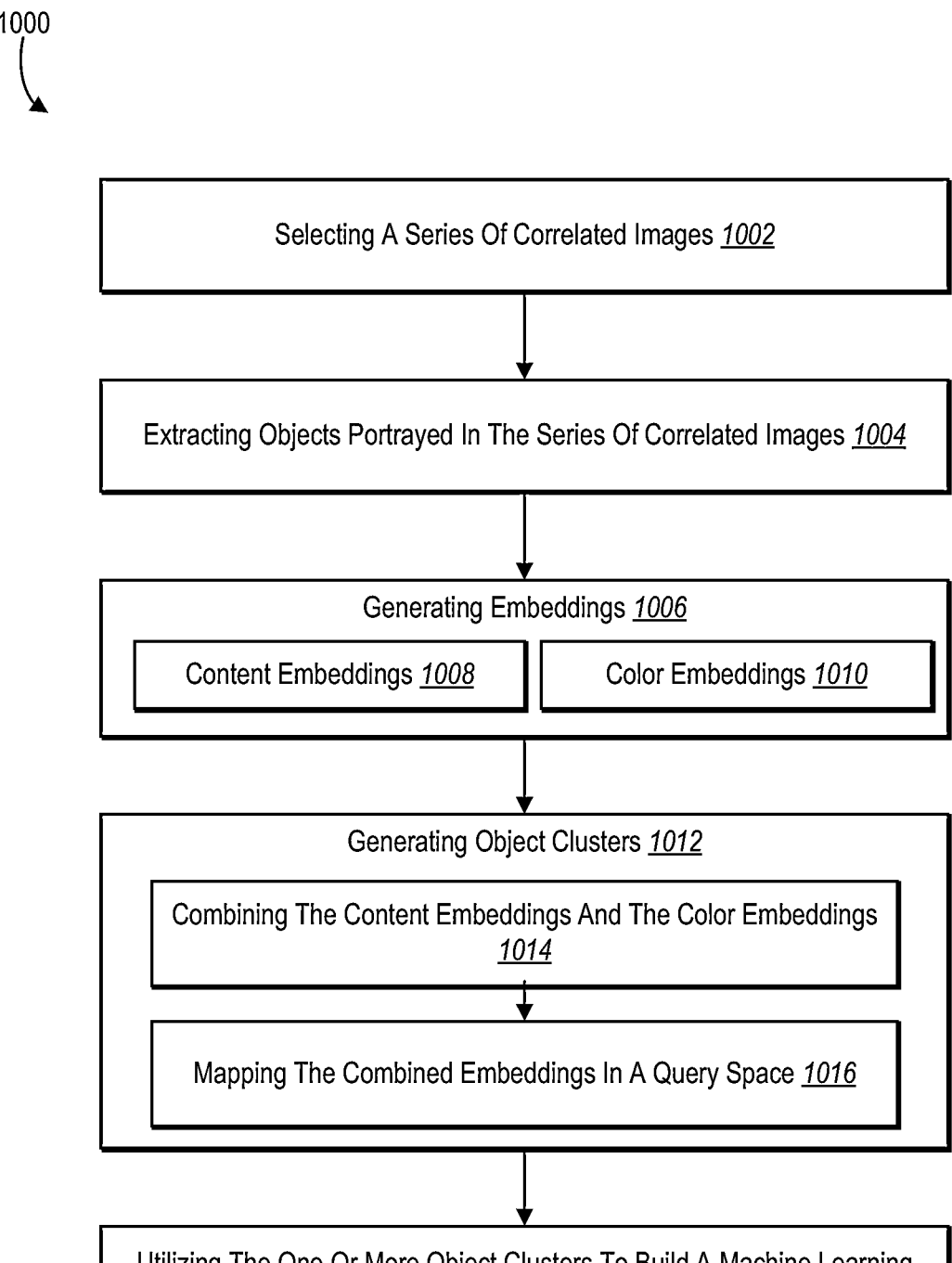
FIG. 10 illustrates a series of acts for utilizing one or more object clusters to build a machine learning model in accordance with one or more embodiments of the present disclosure.

FIGS. 1-9, the corresponding text, and the examples provide a number of different methods, systems, devices, and non-transitory computer-readable media of the instance extraction system 106. In addition to the foregoing, one or more embodiments can also be described in terms of flowcharts comprising acts for accomplishing the particular result, as shown in FIG. 10. The series of acts illustrated in FIG. 10 may be performed with more or fewer acts. Further, the illustrated acts may be performed in different orders. Additionally, the acts described herein may be repeated or performed in parallel with one another or in parallel with different instances of the same or similar acts.

FIG. 10 illustrates a flowchart of a series of acts 1000 for utilizing one or more object clusters to build a machine learning model in accordance with one or more embodiments. In particular, the series of acts 1000 includes an act 1002 of selecting a series of correlated images, an act 1004 of extracting objects portrayed in the series of correlated images, an act 1006 of generating embeddings, an act 1012 of generating object clusters, and an act 1018 of utilizing the one or more object clusters to build a machine learning model.

As illustrated in FIG. 10, the series of acts 1000 includes the act 1002 of selecting a series of correlated images. In particular, the act 1002 comprises selecting a series of correlated images from digital images utilizing metadata associated with the digital images. In one or more embodiments, the act 1002 further comprises selecting the series of correlated images by: determining, based on the metadata associated with the digital images, a subset of digital images having at least one of time metadata tags within a threshold time period, location metadata tags within a threshold distance, or matching user identification metadata tags; and utilizing the subset of digital images to select the series of correlated images.

The series of acts 1000 includes the act 1004 of extracting objects portrayed in the series of correlated images. In particular, the act 1004 comprises extracting objects portrayed in the series of correlated images by generating background masks for the series of correlated images utilizing an object detection model and a segmentation model. In one or more embodiments, the act 1004 further comprises extracting the objects in the series of correlated images by: detecting the objects in the series of correlated images by utilizing an object detection model; generating segmentation masks of the objects in the series of correlated images by utilizing a segmentation model; and removing image data not associated with the segmentation masks from the series of correlated images to generate extracted objects.

In some embodiments, the act 1004 further comprises generating the background masks for the series of correlated images by: detecting the objects in the series of correlated images by utilizing the object detection model; generating segmentation masks of the objects in the series of correlated images by utilizing the segmentation model; and generating the background masks by inverting the segmentation masks.

The series of acts 1000 illustrated in FIG. 10 includes the act 1006 of generating embeddings. In particular, the act 1006 comprises generating content embeddings 1008 and generating color embeddings 1010 for the extracted objects. In one or more embodiments, the act 1006 comprises generating content embeddings and color embeddings for the extracted objects by utilizing a convolutional neural network trained to generate semantic image labels and a color embedding model. In some embodiments, the act 1006 further comprises generating the content embeddings by: generating feature vectors from the extracted objects by utilizing a convolutional neural network trained to generate semantic image labels; and utilizing the feature vectors as the content embeddings to generate the object clusters. Furthermore, in some embodiments, the act 1006 also comprises generating the color embeddings by: grouping pixels of the extracted objects into a plurality of colors to generate color histograms; and utilizing the color histograms as the color embeddings to generate the object clusters.

As further illustrated in FIG. 10, the series of acts 1000 includes the act 1012 of generating object clusters. In particular, the act 1012 comprises additional act 1014 of combining the content embeddings and the color embeddings and act 1016 of mapping the combined embeddings in a query space. In some embodiments, the act 1016 further comprises generating the object clusters by: combining the content embeddings and the color embeddings for the extracted objects; and mapping the combined embeddings corresponding to the extracted objects in a query space. Furthermore, in one or more embodiments, the act 1016 further comprises generating the object clusters comprises utilizing a density-based clustering algorithm to generate the object clusters from the combined embeddings corresponding to the extracted objects in the query space.

The series of acts 1000 illustrated in FIG. 10 also includes the act 1018 of utilizing the one or more object clusters to build a machine learning model. In particular, the act 1018 comprises utilizing one or more of the object clusters and corresponding digital images to build a machine learning model. In some embodiments, the act 1018 further comprises utilizing the one or more of the object clusters to build the machine learning model by utilizing groups of digital images corresponding with the one or more of the object clusters as a ground truth similarity data set for building a digital image similarity machine learning model. In some embodiments, the act 1018 further comprises building a digital image similarity machine learning model by: selecting a pair of ground truth similar images from an object cluster of the deduplicated object clusters; and utilizing the pair of ground truth similar images to train the digital image similarity machine learning model.

Additionally, the series of acts 1000 can include an additional act of selecting the digital images by: determining one or more historical image queries or upload keywords; determining one or more image responses corresponding to the one or more historical image queries or the upload keywords; and utilizing the image responses, extracting the digital images utilized to select the series of correlated images.

In some embodiments, the series of acts 1000 includes an additional act of deduplicating the object clusters by merging nearest object clusters of the object clusters based on a threshold distance value. In particular, in some embodiments, the additional act comprises deduplicating the object clusters by: generating a mean cluster embedding for an object cluster of the object clusters; generating a nearest mean cluster embedding for a nearest object cluster; and merging the nearest object cluster with the object cluster based on a distance between the nearest mean cluster embedding and the mean cluster embedding falling within a threshold distance value.

Furthermore, in some embodiments, the series of acts 1000 includes an additional act of utilizing the digital image similarity machine learning model by processing a plurality of digital images utilizing the digital image similarity machine learning model to generate a plurality of digital image embeddings for use in responding to digital image queries. In some embodiments, the additional act further comprises processing the plurality of digital images by: generating an embedding for a digital image query; and comparing the embedding for the digital image query with the plurality of digital image embeddings to identify a matching digital image corresponding to the digital image query.

In one or more embodiments, the series of acts 1000 includes an additional act comprising utilizing one or more of the deduplicated object clusters and instance labels associated with the one or more of the deduplicated object clusters to build an object classification machine learning model; and utilizing the object classification machine learning model to generate predicted instance labels for objects portrayed in a plurality of images.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
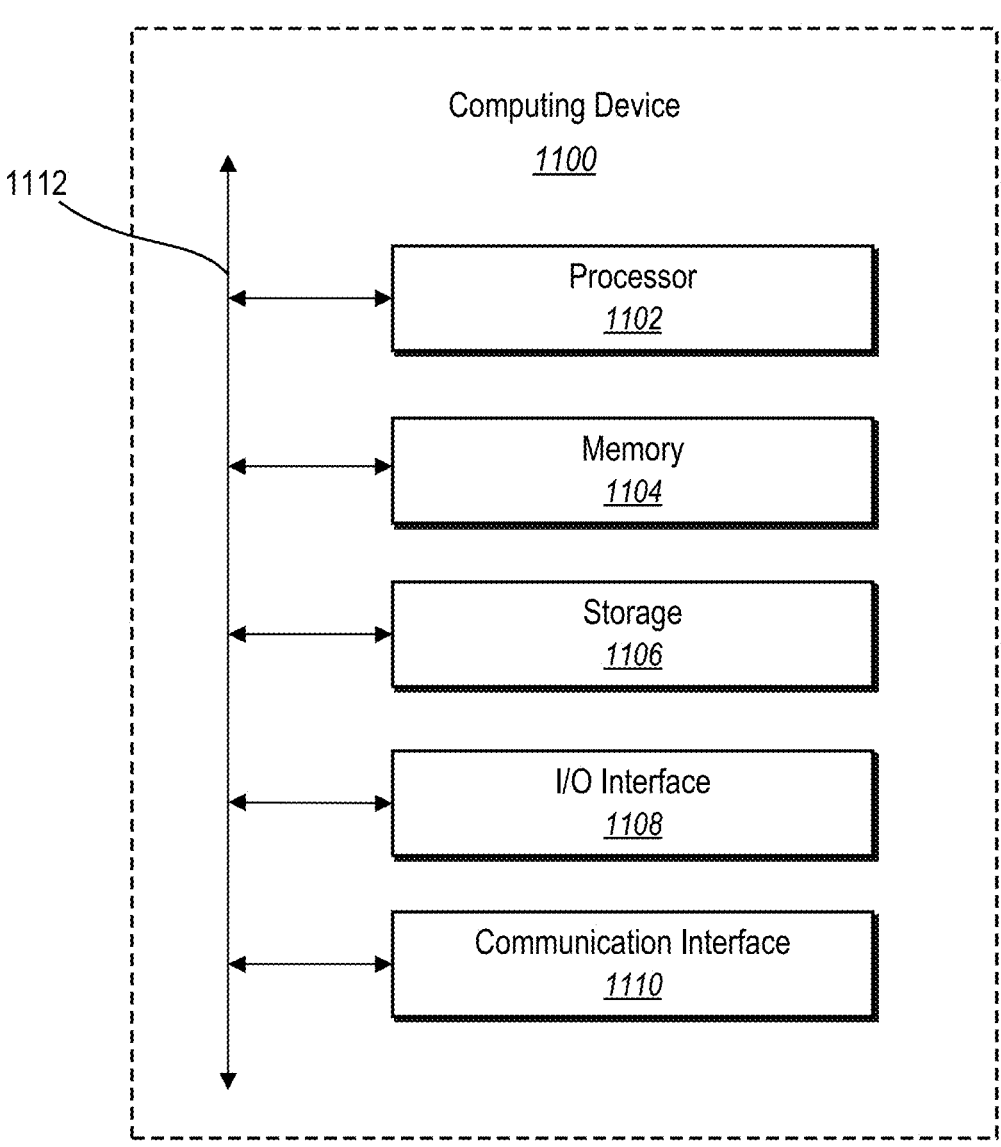
FIG. 11 illustrates a block diagram of an example computing device in accordance with one or more embodiments of the present disclosure.

FIG. 11 illustrates a block diagram of a computing device 1100 that may be configured to perform one or more of the processes described above. One will appreciate that one or more computing devices such as the computing device 1100 may implement the instance extraction system 106 and the digital image management system 104. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:

select a series of correlated images from digital images utilizing metadata associated with the digital images;

extract objects portrayed in the series of correlated images by:

detecting the objects in the series of correlated images by utilizing an object detection model;

generating segmentation masks of the objects in the series of correlated images by utilizing a segmentation model; and removing image data not associated with the segmentation masks from the series of correlated images to generate extracted objects;

generate content embeddings and color embeddings for the extracted objects;

generate object clusters by grouping semantically similar objects from the content embeddings and the color embeddings utilizing a clustering algorithm;

deduplicate the object clusters by merging nearest object clusters of the object clusters; and utilize one or more of the deduplicated object clusters and corresponding digital images to build a machine learning model by:

selecting a pair of ground truth similar images from an object cluster of the deduplicated object clusters; and utilizing the pair of ground truth similar images to train a digital image similarity machine learning model.

2. The non-transitory computer readable medium as recited in claim 1, further comprising instructions that, when executed by the at least one processor, cause the computing device to select the series of correlated images by:

determining, based on the metadata associated with the digital images, a subset of digital images having at least one of time metadata tags within a threshold time period, location metadata tags within a threshold distance, or matching user identification metadata tags; and utilizing the subset of digital images to select the series of correlated images.

3. The non-transitory computer readable medium as recited in claim 1, further comprising instructions that, when executed by the at least one processor, cause the computing device to select the digital images by:

determining one or more historical image queries or upload keywords;

determining a set of images corresponding to the one or more historical image queries or the upload keywords; and utilizing the set of images, extracting the digital images utilized to select the series of correlated images.

4. The non-transitory computer readable medium as recited in claim 1, further comprising instructions that, when executed by the at least one processor, cause the computing device to process a plurality of digital images utilizing the machine learning model to generate a plurality of digital embeddings for use in responding to digital image queries.

5. The non-transitory computer readable medium as recited in claim 1, further comprising instructions that, when executed by the at least one processor, cause the computing device to generate the content embeddings by:

generating feature vectors from the extracted objects by utilizing a convolutional neural network trained to generate semantic image labels; and utilizing the feature vectors as the content embeddings to generate the object clusters.

6. The non-transitory computer readable medium as recited in claim 1, further comprising instructions that, when executed by the at least one processor, cause the computing device to generate the color embeddings by:

grouping pixels of the extracted objects into a plurality of colors to generate color histograms; and utilizing the color histograms as the color embeddings to generate the object clusters.

7. The non-transitory computer readable medium as recited in claim 1, further comprising instructions that, when executed by the at least one processor, cause the computing device to generate the object clusters by:

combining the content embeddings and the color embeddings for the extracted objects; and mapping the combined embeddings corresponding to the extracted objects in a query space.

8. The non-transitory computer readable medium as recited in claim 7, further comprising instructions that, when executed by the at least one processor, cause the computing device to generate the object clusters comprises utilizing a density-based clustering algorithm to generate the object clusters from the combined embeddings corresponding to the extracted objects in the query space.

9. The non-transitory computer readable medium as recited in claim 1, further comprising instructions that, when executed by the at least one processor, cause the computing device to deduplicate the object clusters by:

generating a mean cluster embedding for an object cluster of the object clusters;

generating a nearest mean cluster embedding for a nearest object cluster; and merging the nearest object cluster with the object cluster based on a distance between the nearest mean cluster embedding and the mean cluster embedding falling within a threshold distance value.

10. The non-transitory computer readable medium as recited in claim 1, further comprising instructions that, when executed by the at least one processor, cause the computing device to utilize the one or more of the object clusters to build the machine learning model by utilizing groups of digital images corresponding with the one or more of the object clusters as a ground truth similarity data set for building the digital image similarity machine learning model.

11. A system comprising:
at least one memory device comprising digital images having metadata; and
at least one server device configured to cause the system to:
select a series of correlated images from the digital images utilizing the metadata associated with the digital images by grouping digital images having related metadata tags;
extract objects portrayed in the series of correlated images by generating background masks for the series of correlated images utilizing an object detection model and a segmentation model;
generate content embeddings and color embeddings for the extracted objects by utilizing a convolutional neural network trained to generate semantic image labels and a color embedding model;
generate object clusters by grouping semantically similar objects from the content embeddings and the color embeddings utilizing a clustering algorithm by mapping combined embeddings in a query space; and
deduplicate the object clusters by merging nearest object clusters of the object clusters based on a threshold distance value; and
build a digital image similarity machine learning model by:
selecting a pair of ground truth similar images from an object cluster of the deduplicated object clusters; and
utilizing the pair of ground truth similar images to train the digital image similarity machine learning model.

12. The system as recited in claim 11, wherein the at least one server device is further configured to cause the system to generate the extracted objects by removing image data not associated with the background masks from the series of correlated images.

13. The system as recited in claim 11, wherein the at least one server device is further configured to cause the system to utilize the digital image similarity machine learning model by processing a plurality of digital images utilizing the digital image similarity machine learning model to generate a plurality of digital image embeddings for use in responding to digital image queries.

14. The system as recited in claim 11, wherein the at least one server device is further configured to cause the system to:
utilize one or more of the deduplicated object clusters and instance labels associated with the one or more of the deduplicated object clusters to build an object classification machine learning model; and
utilize the object classification machine learning model to generate predicted instance labels for objects portrayed in a plurality of images.

15. The system as recited in claim 11, wherein the at least one server device is further configured to generate the background masks for the series of correlated images by:
detecting the objects in the series of correlated images by utilizing the object detection model;
generating segmentation masks of the objects in the series of correlated images by utilizing the segmentation model; and
generating the background masks by inverting the segmentation masks.

16. In a digital medium environment for processing a repository of digital images, a computer-implemented method comprising:
select a series of correlated images from digital images utilizing metadata associated with the digital images;
extracting objects portrayed in a series of correlated images by:
detecting the objects in the series of correlated images by utilizing an object detection model;
generating segmentation masks of the objects in the series of correlated images by utilizing a segmentation model; and
removing image data not associated with the segmentation masks from the series of correlated images to generate extracted objects;
generating content embeddings and color embeddings for the extracted objects;
generating object clusters by grouping the content embeddings and the color embeddings utilizing a clustering algorithm;
utilizing one or more of the object clusters and corresponding digital images to build a digital image similarity machine learning model;
deduplicating the object clusters by merging nearest object clusters of the object clusters based on a threshold distance value; and
utilizing one or more of the deduplicated object clusters to build the digital image similarity machine learning model by:
selecting a pair of ground truth similar images from an object cluster of the deduplicated object clusters; and
utilizing the pair of ground truth images to train the digital image similarity machine learning model.

17. The computer-implemented method as recited in claim 16, further comprising generating the content embeddings by:
generating feature vectors from the extracted objects by utilizing a convolutional neural network trained to generate semantic image labels; and
utilizing the feature vectors as the content embeddings to generate the object clusters.

18. The computer-implemented method as recited in claim 16, further comprising generating the color embeddings by generating color histograms from the extracted objects.

19. The computer-implemented method as recited in claim 16, further comprising:
processing a plurality of digital images utilizing the digital image similarity machine learning model to generate a plurality of digital image embeddings for use in responding to digital image queries.

20. The computer-implemented method as recited in claim 16, further comprising generating the object clusters by:
combining the content embeddings and the color embeddings for the extracted objects; and mapping the combined embeddings corresponding to the
extracted objects in a query space.

\* \* \* \* \*